United States Patent
Fisher et al.

(10) Patent No.: US 9,986,068 B2
(45) Date of Patent: May 29, 2018

(54) SAFETY NETWORKING PROTOCOL AND METHOD

(71) Applicant: Profire Energy, Inc, Lindon, UT (US)

(72) Inventors: Patrick David Fisher, Spruce Grove (CA); Benjamin Ryan Northcott, Edmonton (CA); Curtis Michael Dublanko, Edmonton (CA)

(73) Assignee: PROFIRE ENERGY, INC, Lindon, UT (US)

( * ) Notice: Subject to any disclaimer, the term of this patent is extended or adjusted under 35 U.S.C. 154(b) by 267 days.

(21) Appl. No.: 14/856,444

(22) Filed: Sep. 16, 2015

(65) Prior Publication Data

US 2017/0078455 A1    Mar. 16, 2017

(51) Int. Cl.
G06F 15/16 (2006.01)
H04L 29/06 (2006.01)
H04L 29/08 (2006.01)

(52) U.S. Cl.
CPC .............. *H04L 69/03* (2013.01); *H04L 67/12* (2013.01); *H04L 69/326* (2013.01)

(58) Field of Classification Search
USPC ................ 709/232, 202, 218, 223, 224, 227
See application file for complete search history.

(56) References Cited

U.S. PATENT DOCUMENTS

| | | |
|---|---|---|
| 5,825,890 A | 10/1998 | Elgamal |
| 5,838,589 A | 11/1998 | Nail |
| 5,997,280 A | 12/1999 | Welz |
| 6,247,919 B1 | 6/2001 | Welz |
| 6,272,523 B1 | 8/2001 | Factor |
| 6,324,582 B1 | 11/2001 | Sridhar |
| 6,526,446 B1 | 2/2003 | Yang |
| 6,584,112 B1 | 6/2003 | Takahashi |
| 6,614,808 B1 | 9/2003 | Gopalakrishna |
| 6,651,117 B1 | 11/2003 | Wilson |
| 6,819,677 B1 | 11/2004 | Nouzovsky |
| 6,967,589 B1 | 11/2005 | Peters |
| 7,243,174 B2 | 7/2007 | Sheahan |
| 7,277,777 B2 | 10/2007 | Draxton |
| 7,349,400 B2 | 3/2008 | Khirman |
| 7,356,039 B1 | 4/2008 | DiMambro |
| 7,400,622 B2 | 7/2008 | Smathers |
| 7,436,797 B2 | 10/2008 | Shepard |
| 7,447,788 B2 | 11/2008 | Ahmed |
| 7,457,274 B2 | 11/2008 | Fantaske |
| 7,493,623 B2 | 2/2009 | Ruutu |
| 7,539,188 B2 | 5/2009 | Liao |
| 7,627,759 B2 | 12/2009 | Langworthy |

(Continued)

FOREIGN PATENT DOCUMENTS

| | | |
|---|---|---|
| CN | 2861701 Y | 1/2007 |
| CN | 202197312 U | 4/2012 |

(Continued)

*Primary Examiner* — Lan-Dai T Truong
(74) *Attorney, Agent, or Firm* — Stoel Rives, LLP

(57) ABSTRACT

A distributed networking system and protocol is provided to a networking system with a modular design. The distributed networking system may include a networking system, modules, control module, user interface module, input/output module, network module, data transmission network, hybrid modules and composite modules. A method to interface with accessories of a system with a modular design using the distributed networking system and protocol is also provided.

20 Claims, 9 Drawing Sheets

(56) References Cited

U.S. PATENT DOCUMENTS

| | | |
|---|---|---|
| 7,715,432 B2 | 5/2010 | Bennett |
| 7,830,273 B2 | 11/2010 | Twitchell, Jr. |
| 7,917,675 B2 | 3/2011 | Murphy |
| 8,295,166 B2 | 10/2012 | Woo |
| 8,509,927 B2 | 8/2013 | Schmidt |
| 8,653,985 B2 | 2/2014 | Kent |
| 8,667,091 B2 | 3/2014 | Almadi |
| 8,688,828 B2 | 4/2014 | Yadav |
| 8,737,398 B2 | 5/2014 | Soni |
| 8,761,174 B2 | 6/2014 | Jing |
| 8,799,504 B2 | 8/2014 | Capone |
| 8,855,019 B2 | 10/2014 | Elliott et al. |
| 8,862,769 B2 | 10/2014 | Watson |
| 8,953,608 B1 | 2/2015 | Borker |
| 9,013,322 B2 | 4/2015 | Roberson |
| 2001/0053145 A1 | 12/2001 | Willars |
| 2002/0019844 A1 | 2/2002 | Kurowski |
| 2003/0115356 A1 | 6/2003 | Block |
| 2004/0010651 A1 | 1/2004 | Wiegert |
| 2004/0030794 A1 | 2/2004 | Hugly |
| 2004/0148326 A1 | 7/2004 | Nadgir |
| 2004/0181530 A1 | 9/2004 | Smith |
| 2005/0122979 A1 | 6/2005 | Gross |
| 2005/0182521 A1 | 8/2005 | Caves |
| 2006/0031545 A1 | 2/2006 | Manders |
| 2006/0053229 A1 | 3/2006 | Choi |
| 2006/0056406 A1 | 3/2006 | Bouchard |
| 2006/0104306 A1 | 5/2006 | Adamczyk |
| 2006/0199123 A1 | 9/2006 | Seguin |
| 2006/0224811 A1 | 10/2006 | Sichner |
| 2007/0118253 A1 | 5/2007 | Dahler |
| 2007/0244614 A1 | 10/2007 | Nathanson |
| 2008/0004727 A1 | 1/2008 | Glanzer |
| 2008/0008168 A1 | 1/2008 | Nadeau |
| 2008/0161942 A1 | 7/2008 | Gunnarshaug |
| 2008/0175246 A1 | 7/2008 | Kunhappan |
| 2008/0301320 A1 | 12/2008 | Morris |
| 2009/0105849 A1 | 4/2009 | Glanzer |
| 2009/0112336 A1 | 4/2009 | Duffy |
| 2009/0207855 A1 | 8/2009 | Watanabe |
| 2009/0214993 A1 | 8/2009 | Fuller |
| 2010/0008320 A1 | 1/2010 | Yeo |
| 2010/0027565 A1 | 2/2010 | Gupta |
| 2011/0069698 A1 | 3/2011 | Schmidt |
| 2011/0107347 A1 | 5/2011 | Raisch |
| 2011/0119550 A1 | 5/2011 | Fantaske |
| 2011/0132592 A1 | 6/2011 | Apple |
| 2011/0142063 A1 | 6/2011 | Kasturi |
| 2011/0282494 A1 | 11/2011 | Tockert |
| 2012/0146663 A1 | 6/2012 | Meagher |
| 2012/0169362 A1 | 7/2012 | Oh |
| 2013/0114482 A1 | 5/2013 | Oh |
| 2013/0191434 A1 | 7/2013 | Smith |
| 2014/0016468 A1 | 1/2014 | Daraiseh |
| 2014/0092884 A1 | 4/2014 | Murphy |
| 2014/0115121 A1 | 4/2014 | Almadi et al. |
| 2014/0147795 A1 | 5/2014 | Tremblay et al. |
| 2014/0196108 A1 | 7/2014 | Barr |
| 2014/0201265 A1 | 7/2014 | Frazer |
| 2014/0223169 A1 | 8/2014 | Ozaki et al. |
| 2014/0230008 A1 | 8/2014 | Feroz |
| 2014/0269744 A1 | 9/2014 | Flanders et al. |
| 2014/0277764 A1 | 9/2014 | Burt |
| 2014/0281480 A1 | 9/2014 | Petty |
| 2015/0037742 A1 | 2/2015 | Malm et al. |
| 2015/0085878 A1 | 3/2015 | Kangarlou et al. |

FOREIGN PATENT DOCUMENTS

| | | |
|---|---|---|
| CN | 103081382 A | 5/2013 |
| CN | 103250390 A | 8/2013 |
| CN | 203241816 U | 10/2013 |
| CN | 203518572 U | 4/2014 |
| SG | 124338 A1 | 8/2006 |
| WO | 2014150706 A1 | 9/2014 |

SAFETY NETWORKING PROTOCOL AND METHOD

FIELD OF THE INVENTION

The present invention relates to a networking protocol. More particularly, the invention relates to a networking protocol usable with a modular system.

BACKGROUND

Industrial applications typically employ systems including multiple different components in a system. For example, a gas combustion appliance may include sensors, actuators, interfaces, controllers, and other components. These components may exchange control and data signals with a connected controller unit using analog signaling. Analog signaling often requires expensive cabling such as heavy gauge copper wire, specialized thermocouple wire, or shielded and insulated ignition wire. Analog signaling is also prone to interference from electrical and other types of noise. For at least this reason, industrial control systems typically must locate control components close to the component being controlled or monitored to reduce installation costs and to minimize susceptibility to noise.

More complex industrial applications include multiple appliance and other components on a common site that typically needs to be coordinated for proper operation and for safety. These applications are often controlled and monitored by a centralized plant control system. In the case of smaller sites, the plant control system is often a programmable logic controller (PLC). PLCs greatly increase cost since they include safety certified software and hardware. Additional cost in the present art results from programming the PLCs to fulfill a specific or targeted task by a trained professional.

The plant control system will often communicate with other controllers or PLCs at the site. These additional controllers typically perform a more specialized task beyond duties associated with the plant control system. Commonly, data is transmitted between these controller using aging protocols, such as supervisory control and data acquisition (SCADA) protocols. One example of a SCADA protocol is Modbus, which has a low data rate and other limitation on the data itself. For example, since Modbus was designed decades ago when 16-bit data was common, the protocol lacks support for large binary objects, descriptions of data objects for nodes, or security precautions against unauthorized commands or interception of data. Additionally, Modbus and similar protocols require specialized connections configured with a properly terminated daisy-chain or multi-drop bus wiring scheme.

Additionally, due to the inherently inflexible nature of current industrial control systems, expansion or modification is typically highly involved and expensive. This is due to the fact that adding a new component may require multiple different types of wires to connect it, including power, digital control and status lines, and analog control and status lines. Current industrial control system typically additionally require PLC programming to add support for additional components added to the control and safety logic.

Therefore, a need exists to solve the deficiencies present in the prior art. What is needed is a customizable networking system. What is needed is a networking system with a modular design. What is needed is a networking system that is easily expandable. What is needed is a networking system capable of communicating operating instructions and data between modules with virtually no susceptability to noise. What is needed is a protocol to facilitate communication of data between modules via a distributed networking system. What is needed is a modern, novel communications bus and protocol to facilitate safe transmission of data via a distributed networking system. What is needed is a system which supplies power and data over the communications bus and protocol. What is needed is a system which substantially eliminates the need for separate PLCs on common types of industrial sites.

SUMMARY

An aspect of the invention advantageously provides a customizable networking system. An aspect of the invention advantageously provides a networking system with a modular design. An aspect of the invention advantageously provides a networking system that is easily expandable. An aspect of the invention advantageously provides a networking system capable of communicating operating instructions and data between modules with virtually no susceptability to noise. An aspect of the invention advantageously provides a protocol to facilitate communication of data between modules via a distributed networking system. An aspect of the invention advantageously provides a modern, novel communications bus and protocol to facilitate safe transmission of data via a distributed networking system. An aspect of the invention advantageously provides a system which supplies power and data over the communications bus and protocol. An aspect of the invention advantageously provides a system which substantially eliminates the need for separate PLCs on common types of industrial sites.

The invention generally relates to a networking system with a modular design. The networking system can include various modules to distribute communication and control tasks of an electronic system. Various module types may be included by the system to perform assigned tasks or relay data communications. The modules can be communicatively connected via a network. The modules may be organized in a hierarchical structure. Multiple modules may be included by a system.

The distributed networking system can include user interface (UI) class modules, control class modules, input/output (I/O) class modules, and network class modules. The control class modules may include one or more control modules which may receive and process sensory data from one or more other modules and/or accessories. The control modules may also provide operating instructions and data to one or more other modules. The interface class modules may include one or more interface modules which may provide an interface through which an operator may manipulate the system. The I/O class modules may include one or more I/O modules, which may include sensors to detect a condition, such as an operating or environmental condition, and/or components to direct operational instructions to an accessory. Data relating to the condition may be communicated from one or more I/O modules to a connected control module. The I/O module may include an accessory, such as an actuator or other control device. The control module may transmit instructions to the I/O module to control the operational state of the actuator or other control device. Network class modules may direct the communication of data among other modules, operating similarly to a network switch. One or more first switch, which are first network class modules, may relay data communications between an I/O class module and a control class module. One or more second switch, which are second network class modules, may relay data communications between a control class module and an I/O class module. An I/O class module and an interface class module may communicate via a control class module.

The network may be transmitted over Ethernet, using standard physical and data link layers of a communication protocol. The distributed networking system may operate via a proprietary network at the transport layer and above. In some embodiments, the distributed networking system may additionally include proprietary parameters at the network layer. The network connections may optionally transmit power over Ethernet (PoE) using standards based on or similar to IEEE 802.3at.

Accordingly, the disclosure may feature a distributed network system including modules communicable via a network. The modules may include a control module, an interface module, an I/O module, and/or a network module. The control module may include a safety core to communicate data and affect operation of at least part of the modules. The control module may substantially implement a safety state environment by verifying compliance with a safety standard and distributing the safety state environment that is in compliance among the modules. The safety state environment may be at least partially provided by voting logic. The interface module may be communicably connectable with the control module to facilitate interaction with the system. The I/O module may be communicably connected with the control module for at least partially interfacing with an accessory connected to the system. The I/O module may be operable in a sensing configuration and a directing configuration. Interfacing with the accessory while operating in the sensing configuration may include receiving sensory data from the accessory. Interfacing with the accessory while operating in the directing configuration may include providing operational instruction to the accessory. At least part of the network may be a safety network managed by the control module to facilitate reliable communication and substantially prevent unsafe failure conditions in compliance with the safety standard. The safety core may include a processor and memory to analyze and verify the data.

In another aspect, the safety core redundantly may analyze the data. The safety core may include voting logic to verify the data that is analyzed.

In another aspect, the network may be operated over a data link layer including Ethernet. The modules may include a descriptor communicable via a transport layer. The descriptors may include blocks of memory to store details and/or flags.

In another aspect, the system may include a network module communicably connectable among the modules to relay the data communicated among the modules connected to the system via the network module. Optimally, the data relayed via the network module is not altered by the network module. The network module may be included individually or in a group of network class modules.

In another aspect, the network includes a first network section configurable between the interface module and the control module. The network includes a second network section configurable between the control module and the I/O module.

In another aspect, a plurality of control modules may be communicable with the interface module via the first network segment. A plurality of I/O modules may be communicable with the control module via the second network segment.

In another aspect, a hybrid module may be included with the system. The hybrid module may include the modules that are assimilated and identifiable as a single module of the system.

In another aspect, the modules may be collectable as a composite module. The modules included in the composite module may be identifiable as discrete modules of the system.

In another aspect, the safety standard may be at least substantially SIL3 compliant.

In another aspect, the control module may further include power distribution aspects to distribute power from the control module to at least part of the modules of the system.

In another aspect, the control module may be logically associable with one or more additional control modules as an appliance. The control module and at least one of the one or more control modules may collectively direct the appliance to accomplish related tasks. The safety state environment of the system may be improvable via the redundancy, which may include voting and other safety operations, enhanced by the appliance.

In another embodiment, a distributed network system may be provided including modules communicable via a network. The modules may include a control module and an I/O module. The control module may include a safety core to communicate data and affect operation of at least part of the modules. The control module may substantially implement a safety state environment by verifying compliance with a safety standard and providing the safety state environment that is in compliance to the modules. The I/O module may be communicably connected with the control module for at least partially interfacing with an accessory connected to the system. The I/O module may be operable in a sensing configuration and a directing configuration. Interfacing with the accessory while operating in the sensing configuration may include receiving sensory data from the accessory. Interfacing with the accessory while operating in the directing configuration may include providing operational instruction to the accessory. At least part of the network may be a safety network managed by the control module to facilitate reliable communication and substantially prevent unsafe failure conditions. The safety core may include a processor, memory, redundancy, voting logic, and other safety operations to analyze and verify the data. The safety core may further include voting logic to verify the data that is analyzed. The network may be operated over a data link layer including Ethernet. The modules may include a descriptor communicable via a transport layer.

In another aspect, the modules may further include an interface module communicably connectable with the control module to facilitate interaction with the system.

In another aspect, the network may include a first network section configurable between the interface module and the control module. The network may include a second network section configurable between the control module and the I/O module. A plurality of control modules may be communicable with the interface module via the first network segment. A plurality of I/O modules may be communicable with the control module via the second network segment. In one embodiment the first network section and the second network section may be discrete from one another.

In another aspect, the system may further include a network module communicably connectable among the modules to relay the data communicated by the modules. The data relayed via the network module optimally is not altered by the network module.

In another aspect, the control module further includes power distribution aspects to distribute power from the control module to at least part of the modules of the system.

In another aspect, the control module may be logically associable with one or more additional control modules as an appliance. The control module and at least one of the one or more additional control modules may collectively direct the appliance to accomplish related tasks. The safety state environment of the system may be improvable via the redundancy, which may include voting and other safety operations, enhanced by the appliance.

According to one embodiment, a method of interacting with an accessory via a distributed network system of modules communicable via a network is provided. The method may include communicating data via the network. The method may also include affecting operation of at least part of the modules via a control module including a safety core. The method may include verifying compliance with a safety standard and providing a safety state environment that is in compliance with the safety standard to the modules. Additionally, the method may include facilitating interaction with the system via an interface module communicably connectable with the control module. Furthermore, the method may include at least partially interfacing with the accessory connected to the system via an I/O module communicably connected with the control module. The I/O module may be operable in a sensing configuration and a directing configuration. Interfacing with the accessory via the I/O module while operating in the sensing configuration may include receiving sensory data from the accessory. Interfacing with the accessory via the I/O module while operating in the directing configuration may include providing operational instruction to the accessory. At least part of the network may be a safety network managed by the control module to facilitate reliable communication and substantially prevent unsafe failure conditions. The safety core may include a processor and memory to analyze and verify the data.

In another aspect, the network may be operated over a data link layer including Ethernet. The modules may include a descriptor communicable via a transport layer.

In another aspect, the method may further include logically associating the control module with an additional control module as an appliance. The method may additionally include directing the control module and the additional control module to accomplish related tasks via the appliance. Furthermore, the method may include improving the safety state environment of the system via redundancy, which may include voting logic and other safety operations, provided by the appliance.

The distributed networking system can include user interface (UI) class modules, control class modules, input/output (I/O) class modules, and network class modules. The control class modules may include one or more control modules which may receive and process sensory data from one or more other modules and/or accessories. The control modules may also provide operating instructions and data to one or more other modules. The interface class modules may include one or more interface module which may provide an interface through which an operator may manipulate the system. The I/O class modules may include one or more I/O modules, which may include sensors to detect a condition, such as an operating or environmental condition, and/or components to direct operational instructions to an accessory. Data relating to the condition may be communicated from one or more I/O module to a connected control module. The I/O module may include an accessory, such as an actuator or other control device. The control module may transmit instructions to the I/O Module to control the operational state of the actuator or other control device. Network class modules may direct the communication of data among other modules, operating similarly to a network switch. One or more first switch, which are first network class modules, may relay data communications between an I/O class module and a control class module. One or more second switch, which are second network class modules, may relay data communications between a control class module and an I/O class module. An I/O class module and an interface class module may communicate via a control class module.

The network may be transmitted over Ethernet, using standard physical and data link layers of a communication protocol. The distributed networking system may operate via a proprietary network at the transport layer and above. In some embodiments, the distributed networking system may additionally include proprietary parameters at the network layer. The network connections may optionally transmit power over Ethernet (PoE) using standards based on or similar to IEEE 802.3at.

Accordingly, the disclosure may feature a protocol for communicating data via a distributed networking system. The protocol may include information about modules communicably connected to the system. The modules may include a control module. The protocol may also include a descriptor providing at least part of the information about the modules. The protocol may include a safe state environment compliant with a safety standard managed by the control module. Furthermore, the protocol may include a role of the modules definable by the protocol to affect a configuration of the modules. The protocol may be operable via a transport layer of a network. At least part of the network on which the protocol operates may be a safety network managed by the control module to facilitate reliable communication and substantially prevent unsafe failure conditions in compliance with the safety standard. The control module addressable by the protocol further may include a safety core to communicate the data and affect operation of at least part of the modules. The control module may substantially implement the safety state environment by verifying compliance with the safety standard and distributing the safety state environment that is in compliance among the modules. The system may be operable with a firmware including embedded instructions to control the modules. The firmware may be identifiable via the descriptor.

In another aspect, the modules addressable via the protocol may additionally include an interface module and an I/O module. The interface module may be communicably connectable with the control module to facilitate interaction with the system. The I/O module may be communicably connected with the control module for at least partially interfacing with an accessory connected to the system. The I/O module may be operable in a sensing configuration and a directing configuration. Interfacing with the accessory while operating in the sensing configuration may include receiving sensory data from the accessory. Interfacing with the accessory while operating in the directing configuration may include providing operational instruction to the accessory.

In another aspect, the network includes a first network section between the interface module and the control module, wherein the network includes a second network section between the control module and the I/O module, and wherein the protocol is discretely operable on the first network section and the second network section.

In another aspect, the data may be communicable over the first network section via a black channel without strict adherence to the safety standard. The data may be communicable over the second network section in compliance with the safety standard to facilitate the reliable communication and substantially prevent the unsafe failure conditions.

In another aspect, a plurality of control modules may be communicable with the interface module via the first network segment. A plurality of I/O modules may be communicable with the control module via the second network segment.

In another aspect, the communication of the data via the network may be distributable via a network module communicably connected among the modules to relay the data communicated among the modules. The data relayed via the network module may be unaltered by the network module. The protocol may be unaltered by the network module.

In another aspect, the protocol may further include power distribution aspects to distribute power from the control module to at least part of the modules without altering the data communicated via the protocol.

In another aspect, the safety standard may be at least substantially SIL3 compliant.

In another aspect, the protocol operates over a data link layer including Ethernet.

In another aspect, the protocol may additionally include appliance grouping to logically associate the control module with an additional control module as an appliance to direct the control module and the additional control module of the appliance to accomplish related tasks. The safety state environment of the system may be improvable via redundancy, which may include voting logic and other safety operations, provided by the appliance.

In another aspect, the firmware may include a version field of the descriptor to identify a version of the firmware. The firmware may be modifiable to an alternative version that differs from the version identified by the version field via the network.

In another aspect, the safety standard may include redundant analysis of the data via the safety core that includes voting logic to verify the data that is analyzed.

In one embodiment, a protocol is provided for communicating data for a distributed networking system. The protocol may include information about modules communicably connected to the system. The modules may include a control module, an interface module, and an I/O module. The interface module may be communicably connectable with the control module to facilitate interaction with the system. The I/O module may be communicably connected with the control module for at least partially interfacing with an accessory connected to the system. The I/O module may be operable in a sensing configuration and a directing configuration. Interfacing with the accessory while operating in the sensing configuration may include receiving sensory data from the accessory. Interfacing with the accessory while operating in the directing configuration may include providing operational instruction to the accessory. The protocol may include a descriptor providing at least part of the information about the modules. The protocol may include a safe state environment compliant with a safety standard managed by the control module. Furthermore, the protocol may include a role of the modules definable by the protocol to affect a configuration of the modules. The protocol may be operable via a transport layer of a network. At least part of the network on which the protocol operates may be a safety network managed by the control module to facilitate reliable communication and substantially prevent unsafe failure conditions in compliance with the safety standard. The control module addressable by the protocol may further include a safety core to communicate the data and affect operation of at least part of the modules. The control module may substantially implement the safety state environment by verifying compliance with the safety standard and distributing the safety state environment that is in compliance among the modules. The network may include a first network section between the interface module and the control module and a second network section between the control module and the I/O module. The protocol may be discretely operable on the first network section and the second network section.

In another aspect, the data may be communicable over the first network section via a black channel without strict adherence to the safety standard. The data may be communicable over the second network section in compliance with the safety standard to facilitate the reliable communication and substantially prevent the unsafe failure conditions.

In another aspect, communication of the data via the network may be distributable via a network module communicably connected among the modules to relay the data communicated among the modules. The data relayed via the network module may be unaltered by the network module. The protocol may be unaltered by the network module.

In another aspect, the system may be operable with a firmware. The firmware may include embedded instructions to control the modules. The firmware may be identifiable via the descriptor. The firmware may include a version field of the descriptor to identify a version of the firmware. The firmware may be modifiable to an alternative version that differs from the version identified by the version field via the network.

In another aspect, the I/O module may include the accessory.

In one embodiment, a method is provided for communicating data via a distributed networking system. The method includes providing information about modules communicably connected to the system, the modules including a control module. The method additionally includes providing at least part of the information about the modules via a descriptor. The method includes creating a safe state environment compliant with a safety standard managed by the control module. Also, the method includes assigning a role of the modules definable via a protocol to affect a configuration of the modules. The method further includes operating the protocol via a transport layer of a network. At least part of the network on which the protocol may operates may be a safety network managed by the control module to facilitate reliable communication and substantially prevent unsafe failure conditions in compliance with the safety standard. The control module addressable by the protocol further may include a safety core to communicate the data and affect operation of at least part of the modules. The control module may substantially implement the safety state environment by verifying compliance with the safety standard and distributing the safety state environment that is in compliance among the modules. The system may be operable with a firmware including embedded instructions to control the modules. The firmware may be identifiable via the descriptor.

In another aspect of the method, the modules that are addressable may further include an interface module and an I/O module. The interface module may be communicably connectable with the control module to facilitate interaction with the system. The I/O module may be communicably connected with the control module for at least partially interfacing with an accessory connected to the system. The I/O module may be operable in a sensing configuration and a directing configuration. Interfacing with the accessory while operating in the sensing configuration may include receiving sensory data from the accessory. Interfacing with the accessory while operating in the directing configuration may include providing operational instruction to the accessory. The network may include a first network section between the interface module and the control module and a second network section between the control module and the I/O module. The protocol may be discretely operable on the first network section and the second network section. The method may further include communicating the data over the first network section via a black channel without strict adherence to the safety standard. The method may additionally include communicating the data over the second network section in compliance with the safety standard to facilitate the reliable communication and substantially prevent the unsafe failure conditions.

In another aspect of the method, an additional step may include redundantly analyzing the data via the safety core including voting logic. Furthermore, the method may include verifying the data that is analyzed via the voting logic.

Terms and expressions used throughout this disclosure are to be interpreted broadly. Terms are intended to be understood respective to the definitions provided by this specification. Technical dictionaries and common meanings understood within the applicable art are intended to supplement these definitions. In instances where no suitable definition can be determined from the specification or technical dictionaries, such terms should be understood according to their plain and common meaning. However, any definitions provided by the specification will govern above all other sources.

Various objects, features, aspects, and advantages of the invention described by this disclosure will become more apparent from the following detailed description, along with the accompanying drawings in which like numerals represent like components.

DETAILED DESCRIPTION

The following disclosure is provided to describe various embodiments of a distributed networking system. Skilled artisans will appreciate additional embodiments and uses of the present invention that extend beyond the examples of this disclosure. Terms included by any claim are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one of A, B, and C" should be read to permit any of A, B, or C singularly or in combination with the remaining elements. Additionally, such groups may include multiple instances of one or more element in that group, which may be included with other elements of the group. All numbers, measurements, and values are given as approximations unless expressly stated otherwise.

Various aspects of the present invention will now be described in detail, without limitation. In the following disclosure, a distributed networking system and associated protocol will be discussed. Those of skill in the art will appreciate alternative labeling of the distributed networking system and/or associated protocol as a management system, networked processing system, remote management system, the invention, or other similar names. Similarly, those of skill in the art will appreciate alternative labeling of the distributed networking system and/or associated protocol as a data communication system, data communication method, data transmission layers, data packet structure, method, operation, the invention, or other similar names. Skilled readers should not view the inclusion of any alternative labels as limiting in any way.

The distributed networking system may be used in burner management system applications, but also broadly applies to industrial control platforms. For example, without limitation, the distributed networking system may interact with and control systems such as boilers, burners, flare igniters, incinerators, industrial accessories, generic programmable logic controllers (PLCs), and other controllable accessories that would be apparent to a person of skill in the art.

The distributed networking system of this disclosure may include one or more control modules connected to a series of specialized I/O modules located near the equipment or processes that they are monitoring or controlling. These modules may be connected together on a safety network, for example, implementing a protocol associable with the distributed networking system, to facilitate substantially reliable and safe communication. User interface modules may enable users to monitor the status of the system, stop and/or start it, change settings, view event logs and data charts, access built-in help, update firmware, and otherwise interact with the system.

Figure 1:
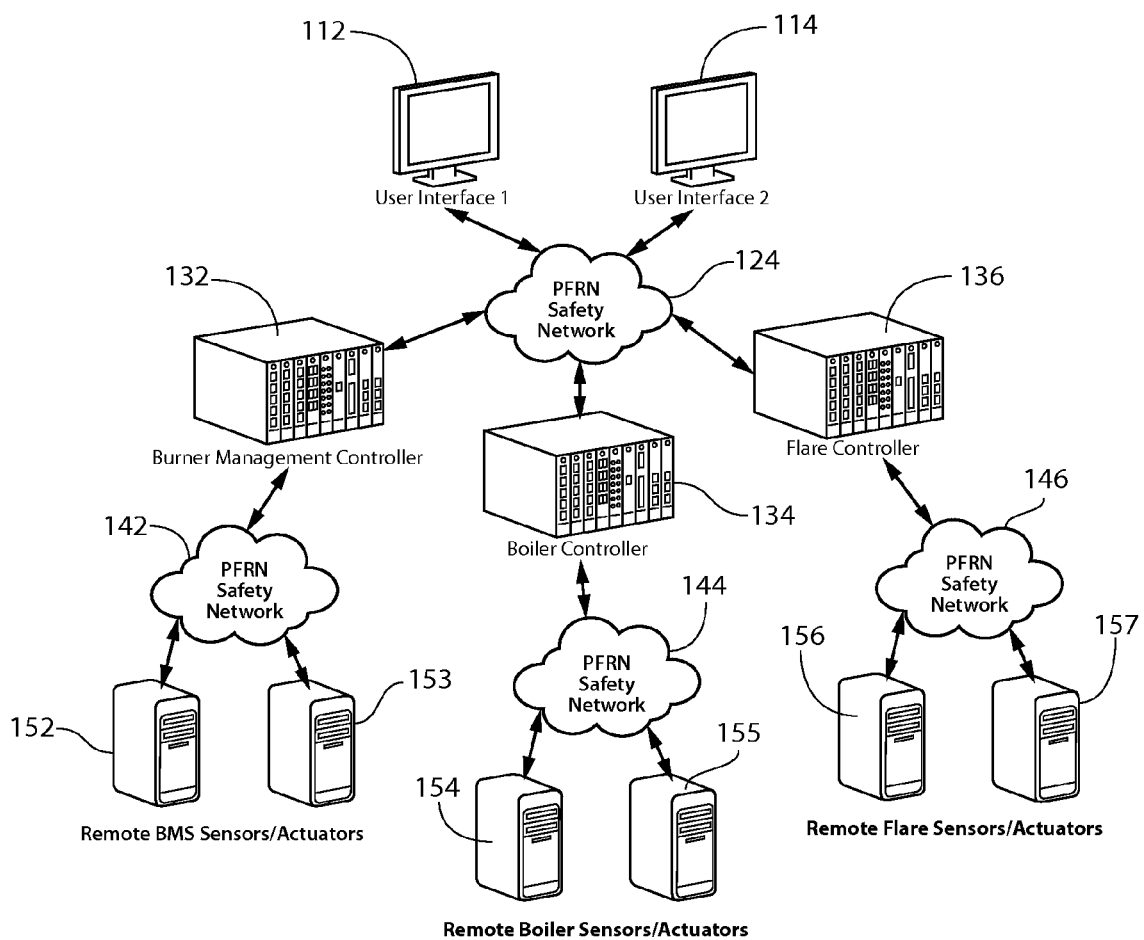
FIG. 1 is a block diagram view of an illustrative distributed networking system, according to an embodiment of this disclosure.

The distributed networking system of this disclosure includes many advantageous features to facilitate customizable deployment and configurable feature sets. For example, the distributed networking system may provide a modular design, protocol-based communication network, simplified set up, field upgradeable firmware, power distribution options, linked modules, and other advantageous features. Regarding the modular design, the system of this disclosure may include modules which can be purchased separately and connected together to form a system, an example of which is illustrated in block diagram 100 of FIG. 1. Each module may perform a function and may be installed close to the equipment measured or controlled. This modular approach simplifies wiring and reduces issues with noise and signal loss compared to centralized control systems. This modular approach also allows the user to purchase only the modules that may be necessary for a given application.

Regarding the protocol for the communication network, the distributed networking system of this disclosure may operate on a proprietary reliability network, ("PFRN"), which may enable substantially safe and reliable communications between modules. In one embodiment, the PFRN may include a physical layer design, which may support up to 32 modules with a target reliable wire distance of 100 meters between modules. This embodiment may create a network designed to act as a failsafe in the event of a fault condition in any part of the system. Skilled artisans will appreciate additional designs supporting more, less, or a similar number of modules.

Due to the modular design, installation and setup may be easy. Since the PRFN can be based on Ethernet and/or similar technologies, connections between modules can be made simple. Settings can be entered from the interface module through an interface, for example, an on-screen menu. Settings may additionally be entered manually via setup screens, loaded via an attached USB flash key, or otherwise provided to the system.

The modules may support field upgradable firmware so that users have access to the latest updates and new features. In addition, the system may automatically detect if a particular module has incompatible and/or uncertified firmware. If detected, the system may prevent an operation which might lead to an unsafe condition.

In addition to data transport, the distributed networking system, which may operate a PFRN physical layer, may be capable of distributing power to the modules connected to it. This form of power distribution may advantageously simplify wiring requirements. Additionally, modules can be logically grouped together to form a linked system with more complex behavior. Linked modules may share status information with each other to ensure that the system as a whole will behave in a substantially safe manner.

In burner management system applications, the distributed networking system and associated protocol may additionally provide multiple burner support, temperature module sharing support, multiple pilot support, expandability, and other features affecting operation of a burner management system. For example, referring to FIG. 1, several control modules 132, 134, 136 can be present in a single system, advantageously connecting to network modules 142, 144, 146 and providing applications with multiple burners and other burner management devices 152, 153, 154, 155, 156, 157 located near one another. Additionally, the control modules 132, 134, 136 may all communicate via network module 124 with one or more interface module 112, 114 instead of consumers being required to buy a whole new system for each burner.

As another example, if multiple control modules are configured to operate as a single appliance, the temperature data from one controller can be shared with the others. This configuration may advantageously eliminate the need to purchase a temperature module for each control module. In an additional example, if a given application requires multiple pilots, multiple ignition modules, a subset of I/O modules can be connected to a single control module, substantially eliminating the need to purchase multiple control modules. Since the ignition detection, flame detection, temperature sensing features, and additional I/O functions may be implemented on separate I/O modules from the control module, the user can advantageously choose the module type that suits their needs.

Referring now to FIGS. 1-17, the distributed networking system will now be discussed in more detail. The distributed networking system may include a networking system, modules, control module, user interface module, input/output module, network module, data transmission network, hybrid modules, composite modules, and additional features that will be discussed in greater detail below. The distributed networking system may operate one or more of these components interactively with other features to provide a networking system with a modular design.

The distributed networking system generally relates to a networking system with a modular design. The networking system can include various modules to distribute communication and control tasks of an electronic system. Various module types may be included by the system to perform assigned tasks or relay data communications. The modules can be communicatively connected via a network. The modules may be organized in a hierarchical structure. Multiple modules may be included by a system.

The distributed networking system will now be discussed in greater detail. The distributing networking system may include modules and a protocol for a safety network. Then physical layer and device aspects of the system may be referred to as components of the "PFRN physical layer" throughout this disclosure. Additionally, the protocol operable on the physical layer may be referred to as a "protocol" or "PFRN protocol" throughout this disclosure. Skilled artisans will appreciate additional aspects that can be included by and operated with the distributed networking system of this disclosure. Modules are typically standalone devices that perform a certain function. The PFRN physical layer is typically an Ethernet based network through which modules may communicate with one another to perform a given task substantially safely via the PFRN protocol. These modules may be physically combined to create composite modules or logically combined to create logical composite modules. The modules, system, and safety network protocol will be discussed in detail in the following sections.

Figure 2:
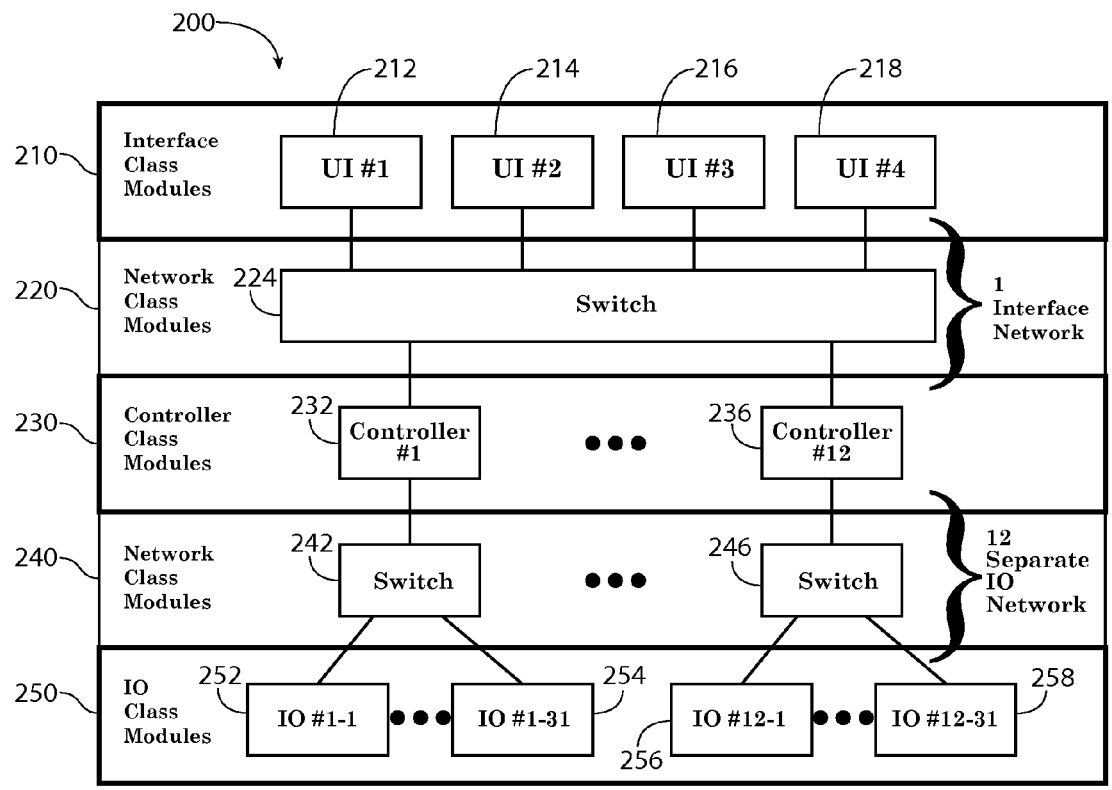
FIG. 2 is a block diagram view of an illustrative system hierarchy, according to an embodiment of this disclosure.

Referring to the illustrative system 200 of FIG. 2, the modules will now be discussed in greater detail. A module may be a collection of circuit boards, embedded software, and/or other components or devices packaged together, for example, in an enclosure. In one embodiment, the module may be marked with a model number and serial number. Modules may have network ports to connect to the PFRN physical layer and communicate with other modules. The modules on the network may fit different classes depending on function. These classes may include the network class modules 220, 240, user interface class modules 210, control class modules 230, and input/output (I/O) class modules 250. The modules may include processors that may be mounted on a PCBA, otherwise referred to as a core. As three example cores will be discussed throughout this disclosure, without limitation, a user interface core ("UIC"), symmetrical safety core ("SSC"), and asymmetrical safety core ("ASC").

Network class modules 220, 240, such as network modules 224, 242, 246, may perform similarly to Ethernet switches. These modules may provide additional Ethernet ports to facilitate the connection of more modules, help route network traffic, and provide power to the network. There is virtually no limit on the number of network modules includable in the system. However, protocol timing may be affected if numerous networking modules are cascaded on a given network. These network class modules 220, 240 generally do not need to be safety certified because they are part of a "black channel." Skilled artisans will appreciate "black channel" to be defined as a data communication channel that serves only as a transmission medium and does not perform any safety-related tasks, as defined by IEC61508. In less complicated networks, it is possible that no network class modules 220, 240 may be required, with other modules connecting directly to each other.

Interface class modules 210 may implement user interfaces and may be similar to human-machine interfaces (HMIs) used in programmable logic controller (PLC)-based control systems. Interface class modules 210 may be used to monitor the system status, configure system settings, log data, update firmware, and perform other functions. In one embodiment, up to four interface class modules 212, 214, 216, 218 can exist in a given system. Skilled artisans will appreciate additional embodiments with varying capacity for interface class modules. When connected to the safety network, interface class modules 210 are typically not safety certified because they generally do not perform any safety critical tasks.

Controller class modules 230 may implement the safety state machine and include substantially all of the settings and configuration information required to perform their assigned function. The safety state machine may include voting logic. Multiple control class modules 230 on the same PFRN physical layer may be logically grouped together as an appliance. The PFRN protocol discussed throughout this disclosure may direct appliance grouping. Controller class modules 230 typically include safety cores with redundant processors and other hardware circuits to ensure that a hardware failure will not lead to an unsafe state. In one embodiment, up to twelve control class modules, including control modules 232, 236, can exist in a given system. Skilled artisans will appreciate additional embodiments with varying capacity for control class modules 230. When connected to the safety network, control class modules 230 are almost always safety certified for the application that they are intended for. Some control class modules 230 may transmit power with data, typically existing in two types: Type P, which produce power for the Safety Network to use and Type C, which consume power from the Safety Network. In systems that distribute power, most control class modules may be Type P.

I/O class modules 250 may be designed to perform a specific I/O task repetitively and in a trusted manner and/or may interface with an accessory to perform the I/O task. I/O class modules 250 may act as remote sensors or actuators controlled by the control class module 230 to which they are connected. Without communication from a control class module 230, these I/O class modules 250 will virtually always sit idle in a safe state. I/O class modules 250 typically include redundant processors and other hardware circuits to ensure that a hardware failure will not lead to an unsafe state. In one embodiment, up to 31 I/O class modules 250, including I/O modules 252, 254, 256, 258, can exist per control module 232, 236. In this embodiment, a maximum of up to 372 I/O modules may be included in a given system. Skilled artisans will appreciate additional embodiments with varying capacity for I/O class modules 250. I/O class modules 250 are typically safety certified but do not have an application specific safety state machine.

Controller class modules 230 and I/O class modules 250 may be assigned a role when they are configured to be part of a system. A role is a variable that defines how the module will behave in the system. A role may be defined respective a physical connection for control class modules 230 and to the controller model number for I/O class modules 250. For example, in one embodiment, roles can be assigned to individual inputs and outputs on a particular module. This assignment of roles could apply to the inputs and outputs of virtually any class of modules. In an alternative embodiment, a role may be defined respective to the appliance type for control class modules 230 and to the controller model number for I/O class modules 250. Those of skill in the art will appreciate additional embodiments in which roles are otherwise assigned to components of the system.

Roles may be assigned to control class modules 230 to define their behavior within an appliance. Alternatively, roles may be assigned to inputs and/or outputs of control class modules 230 to define their behavior within an appliance. In one embodiment, the role variable may be represented by a number. In this illustrative embodiment, role 0 may be reserved for unassigned modules that are physically present in the system but not configured and should therefore remain inactive in their safe state. Role 1 may typically be the default behavior for a module. Other roles may have appliance specific meanings. Any undefined roles will generally result in the module remaining in the safe state, as if set to 0. Skill artisans will appreciate additional variables and designation techniques for assignment of roles, and will appreciate that role variables are not limited to the numeric example provided above.

Roles may be assigned to I/O class modules 250 to define a behavior on the connected control class module 230. Alternatively, roles may be assigned to the inputs and/or outputs of I/O class modules 250, if provided, to define a behavior on the connected control class module 230. Returning to the numeric example without limitation, in general, role 0 may be reserved for unassigned modules that are physically present in the system but which are not configured and should therefore remain inactive in their safe state. Role 1 may be typically the default behavior for a module. Other roles may have controller specific meanings. Roles often define the specific functions assigned to the safety I/O on a given I/O class module 250. Any undefined roles may result in the module remaining in the safe state, for example, as if set to 0.

Figure 3:
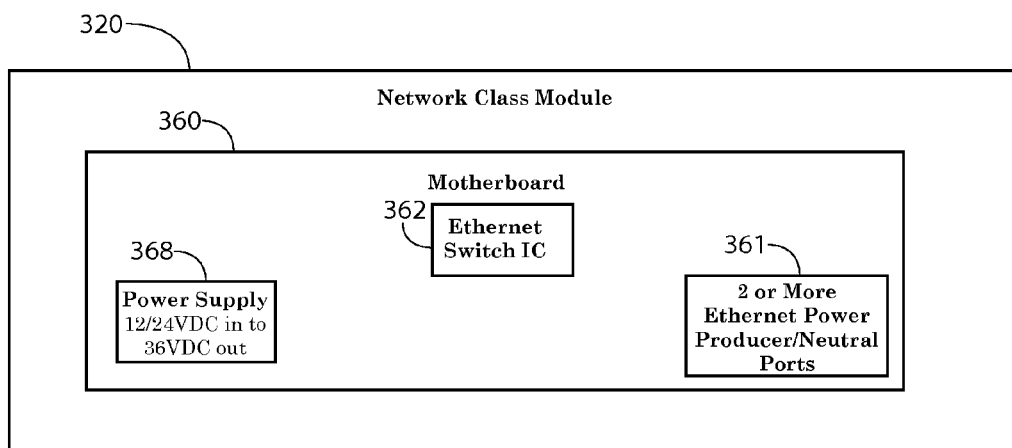
FIG. 3 is a block diagram view of a network class module, according to an embodiment of this disclosure.

Referring additionally to the block diagram of FIG. 3, the network module will now be discussed in greater detail. The block diagram of FIG. 3 illustrates a model architecture of a network class module 320, without limitation. Substantially all network class modules will include a motherboard 360 with Ethernet ports 361, Ethernet switch IC 362, and power supply 368. The Ethernet ports 361 may include power producer and/or neutral ports. Typically, a network class module 320 will have two or more Ethernet ports 361. The Ethernet ports 361 of the network class module 320 may be specially designed ports which supply power when attached to a power consumer port, but are designed not to malfunction if connected to another power producer port. Network class modules typically do not require a processor, thus do not usually include a core.

Ethernet switch ICs 362 may be used to repeat packets from one network segment to another. These Ethernet switch ICs 362 also typically have built in MAC address filtering, enabling the network class module 320 to route packets only to the network segments that are required to pass a given packet to its intended destination.

A power supply 368 may exist on virtually all network class modules 320. In one embodiment, the power supply 168 may receive a 12/24 VDC input and provide 36 VDC out to the Ethernet ports 361 when being used as power producer ports. Skilled artisans will appreciate additional embodiments with various other input and output power levels. A power supply isolation switch may allow an installer to select where the Ethernet power producer ports get their power from, for example, the power supply 368 or both the power supply 368 and the Ethernet power consumer ports. The switch may optionally be omitted and the circuit may include automatic selection of where power source and substantial loop current prevention.

An example hardware configuration for a network class module will now be discussed, without limitation. In this example, a network module may be provided with five Ethernet ports, such as RJ45 Ethernet jacks, connected together through a network switch. This network module can be used to connect an interface module to four controller type modules. Alternatively, this network module may connect one control module to four I/O modules. The network module of this example could also be cascaded with other network modules to enable the connection of even more modules. The network module can be mounted inside an interface module enclosure or in a separate enclosure.

The example network module may not receive power via the network, and may require 12 VDC or 24 VDC applied to its power connector. All ports on this example network module may be power producer ports, providing power to connected devices. All of the ports on the switch may be designed to connect to a power producer port on another module without failure. Since this example module is a network module, it does not have any safety I/O nor does it have an assigned role.

Figure 4:
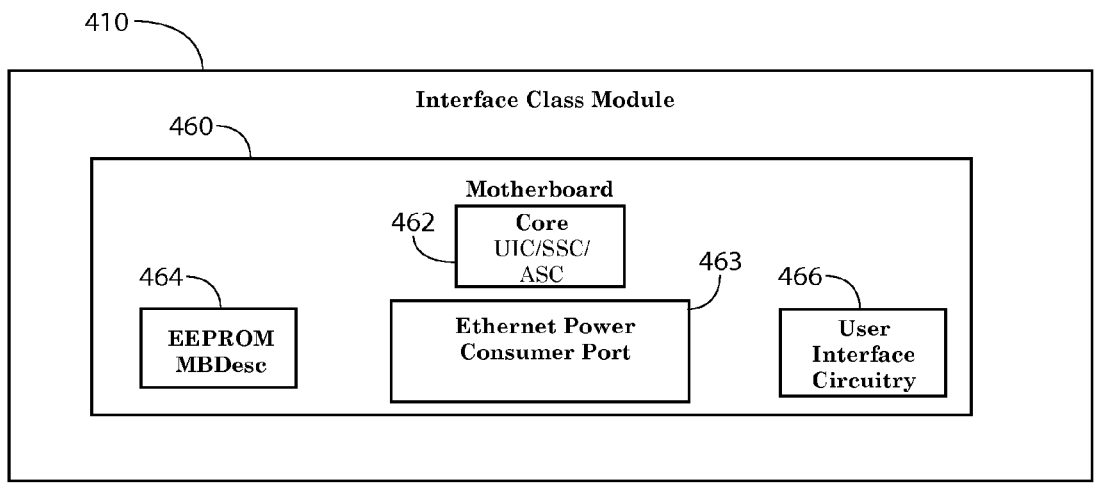
FIG. 4 is a block diagram view of an interface class module, according to an embodiment of this disclosure.

Referring additionally to the block diagram of FIG. 4, the user interface module will now be discussed in greater detail. The block diagram of FIG. 4 illustrates a model architecture of an interface class module 410. Substantially all interface class modules 410 may include a motherboard 460 with a core 462, Ethernet port 463, ROM 464, and user interface circuitry 466. The processor core 462 may be a user interface core ("UIC"), symmetric safety core ("SSC"), asymmetric safety core ("ASC"), or other core as required for the particular application. The Ethernet port 463 may be a power consumer port. Typically, only a single Ethernet port 463 is necessary provided as an Ethernet power consumer port. The Ethernet port 463 may connect either directly to a control class module or indirectly via a network class module. The ROM 464, for example, an EEPROM, may hold the motherboard descriptor ("MBDesc"). The descriptors may be electronically embedded information included by modules, which may share information about the module using the PFRN protocol. The descriptors may include blocks of memory to store details and/or flags.

The interface class module 410 may additionally include user interface circuitry 466 applicable to implement the unique interface to present to the user. The user interface circuitry 466 may include an alpha-numeric display driver, VGA display driver, communications chipset for remote monitoring and control, LEDs, switches, and other components apparent to a skilled artisan after having the benefit of this disclosure.

An example hardware configuration for an interface class module will now be discussed, without limitation. This example interface module may be installed or otherwise located in a place convenient for user operation and viewing. The user interface module may include a physical interface including keys, indicator lights, and other interface elements and a software interface including menus, status screens, and other interface elements.

The hardware user interface may include indicator lights, keypad, and display. As an example, status LEDs may provide feedback, indicating if the system is not powered (off), in startup sequence (flashing green), running (green), stopped (red), or in an alarm or warning state (amber). The display may be a LCD screen, which may display diagnostics, current settings, and options when navigating through menus.

The hardware interface may include various keys to interact with the system. A STOP KEY may stop the system, which may immediately turn off the burner. A BACK KEY may go back one screen and cancel out of dialog boxes. ARROW KEYS may be used to navigate through menus. A TRIPLE BAR KEY may open a menu of global options. An OK KEY may enter a menu, acknowledge a prompt, save an edited setting or return to the home screen. A HELP KEY may access system help. For example, one button press of the HELP KEY may display tooltips for items on the current screen. Two button presses of the HELP KEY may open the integrated user manual for the selected item. +/− KEYS may adjust settings up or down. A START KEY may start the system. A NUMBER PAD may be used to key in changes in settings. A DELETE KEY may delete the last character entered when using the number pad. Other keys will be appreciated by skilled artisans after having the benefit of this disclosure. A locking mechanism may be included to securing the door to the interface hardware.

Referring additionally to the block diagrams of FIGS. 5-6, the control class module will now be discussed in greater detail. The control class module may be provided with variations, for example, Type P and Type C variations.

Figure 5:
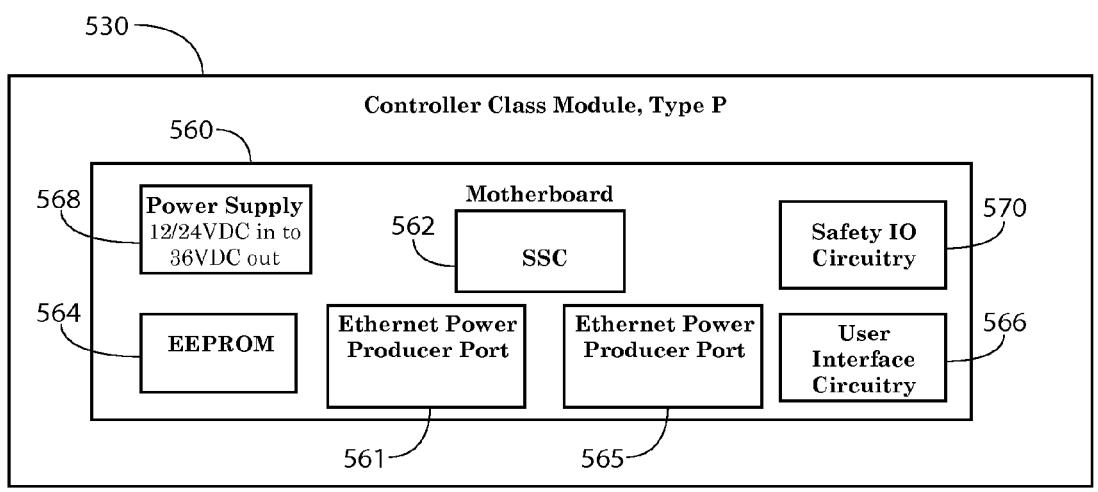
FIG. 5 is a block diagram view of a control class module with power delivery, according to an embodiment of this disclosure.

The block diagram of FIG. 5 illustrates a model architecture of a Type P control class module 530. Substantially all Type P control class modules may include a motherboard 560 with Ethernet port 561, 565, core 562, ROM 564, user interface circuitry 566, power supply 568, and safety I/O circuitry 570. Typically, each Type P control class module 530 will have at least two of Ethernet ports 561, 565, which may be power producing. Generally, one connection will be provided to a single interface class module and one or more connection to one or more I/O class modules. A network module may be included with the control class module 530 as a hybrid module.

The core 562 of this example is a SSC to provide the safety features essential to the safety network. The core 562 may implement a voting scheme to substantially ensure the safety of the critical control functions that the controller provides. The core 562 may additionally maintain a physical separation between the interface network and the controller network, which is facilitated by the two separate MAC/PHY peripherals built into the core. The core 562 may additionally implement a real time clock for logging of events. The ROM 564, for example, an EEPROM, may hold the motherboard descriptor.

Interface circuitry 566 may be implemented on virtually every control class module 530 to provide, at a minimum, high level status information and start/stop controls. If a more complex interface is implemented, the module may be considered a hybrid controller/interface class module. The power supply 568 may exist on virtually all Type P control class modules 530 and may be used in virtually every installation. The power supply 568 may receive a 12/24 VDC input and provide 36 VDC out to the Ethernet ports 561, 565 when being used as power producer ports. Skilled artisans will appreciate additional embodiments with various other input and output power levels. Safety I/O circuitry 570 may be provided to fulfill the safety control and monitoring functions of the control module implemented with redundancy. The safety I/O circuitry 570 may also provide a redundant connection to both processors on the SSC. Implementation of significant safety I/O may be provided by a hybrid controller/I/O class module.

Figure 6:
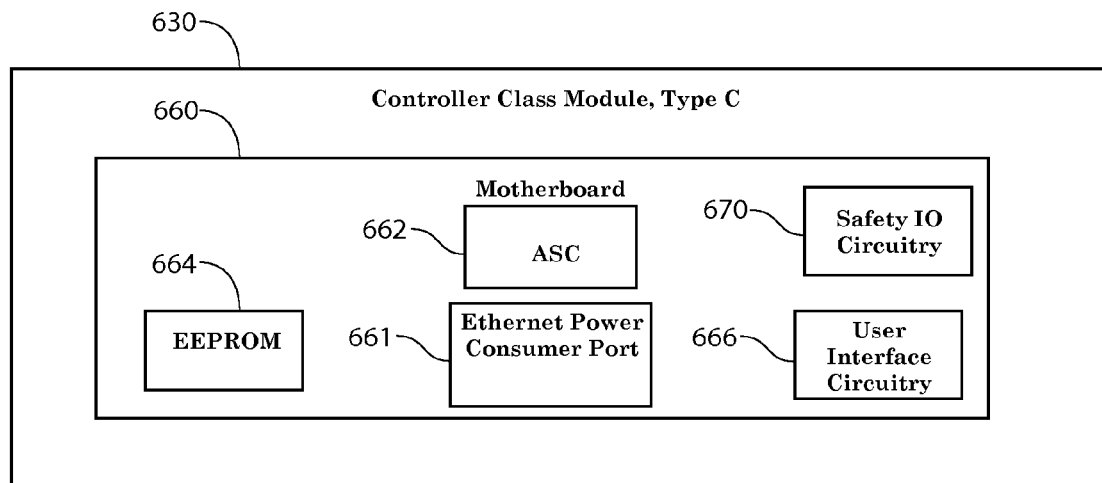
FIG. 6 is a block diagram view of an alternative control class module, according to an embodiment of this disclosure.

The block diagram of FIG. 6 illustrates a model architecture of a Type C control class module 630. Substantially all Type C control class modules may include a motherboard 660 with Ethernet port 661, core 662, ROM 664, user interface circuitry 666, power supply 668, and safety I/O circuitry 670. Typically, each Type C control class module 630 will have at least one Ethernet port 661, which may be connected to an interface class module. A network module may be included with the control class module 630 as a hybrid module.

The core 662 of this example may be an ASC to provide the safety features essential to the safety network. The core 662 may implement a voting scheme to substantially ensure the safety of the critical control functions that the controller provides. The core 662 may additionally reduce costs, since only one MAC/PHY peripherals is required and no RTC is needed. The ROM 664, for example, an EEPROM, may hold the motherboard descriptor.

User interface circuitry 666 may be implemented on virtually every control class module 630 to provide, at a minimum, high level status information and start/stop controls. If a more complex interface is implemented, the module may be considered a hybrid controller/interface class module. Safety I/O circuitry 670 may be provided to fulfill the safety control and monitoring functions of the control module implemented with redundancy. The safety I/O circuitry 670 may also provide a redundant connection to both processors on the ASC. Implementation of significant safety I/O may be provided by a hybrid controller/I/O class module.

An example hardware configuration of a control class module will now be discussed, without limitation. The control class module may implement the safety control functions of a distributed networking system. The control class module may be designed to facilitate greater ease of use, more reliable operation, multiple applications, and expandability to enable future features.

The control class module can be powered from 12 VDC or 24 VDC at up to 10 A. The module may include a fuse and/or breaker to prevent overcurrent. The control class module of this example may, on its own, draw up to 900 mA, not including valves. Additional current, may be drawn by loads on attached circuits such as valves. The module may include built-in valve control outputs for safety solenoid valves, proportional control valves, and additional valves. It is possible to connect multiple valves to the same control output. Type P control modules may include a 12/24V power input terminal so that it can source power over the PFRN physical layer to connected interface and I/O modules.

Figure 7:
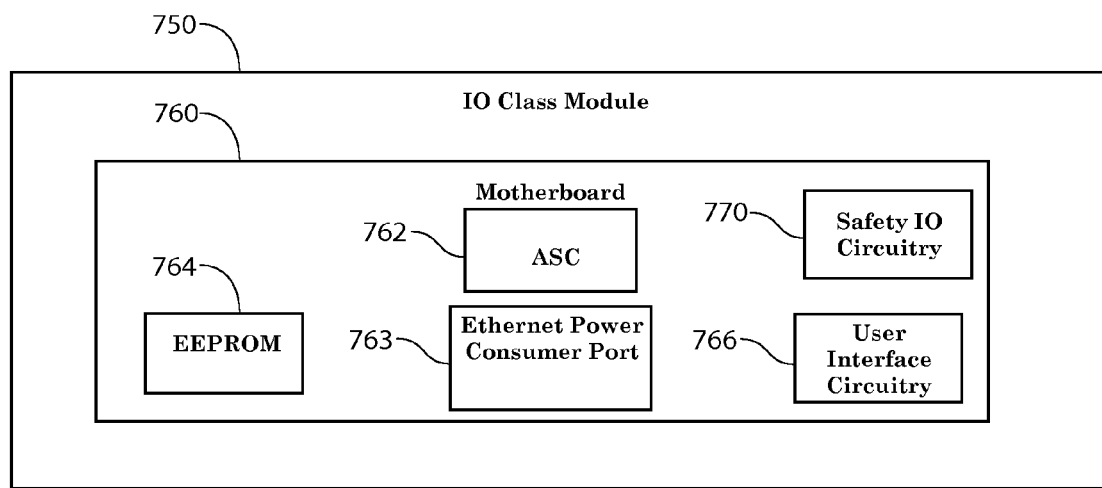
FIG. 7 is a block diagram view of an I/O class module, according to an embodiment of this disclosure.

Referring additionally to the block diagram of FIG. 7, the I/O module will now be discussed in greater detail. The block diagram of FIG. 7 illustrates a model architecture of an I/O class module 750. Substantially all I/O class modules may include a motherboard 760 with Ethernet port 763, core 762, ROM 764, user interface circuitry 766, and safety I/O circuitry 770. Typically, each I/O class module 730 will have at least one Ethernet port 763, which may be connected to a control class module.

The I/O module may include and/or be communicably connected to an accessory, which may include a sensing configuration and/or a directing configuration. If the I/O module is operating in a sensing configuration, the I/O module may interface with the accessory to receive sensory data from the accessory. For example, the I/O module may include an accessory such as a temperature sensor, which may collect temperature data from the field and communicate this sensory data to a control module. Additionally, if the I/O module is operating in a directing configuration, the I/O module may provide operational instruction received by a control module to the accessory. As an example, the I/O module may include an actuator to control the intensity of a burner by adjusting a valve aperture in response to operational instructions received by the control module. Examples of accessories, provided without limitation, can include sensors, actuators, boiler sensors, valves, servos, relays, solenoids, flare sensors, tank heaters, thermometers, cabin heaters, lead-lag boiler control components, combustors, incinerators, monitors, data loggers, humidity sensors, and other accessories that would be apparent to a skilled artisan after having the benefit of this disclosure.

The core 762 of this example may be an ASC to provide the safety features essential to the safety network. The core 762 may implement a voting scheme to substantially ensure the safety of the critical functions that the module provides. The core 762 may additionally reduce costs, since only one MAC/PHY peripheral is required and no RTC is needed. The ROM 764, for example, an EEPROM, may hold the motherboard descriptor.

User interface circuitry 766 may be implemented on virtually every I/O class module 750 to provide, at a minimum, high level status information and start/stop controls. If a more complex interface is implemented, the module may be considered a hybrid controller/interface class module. Safety I/O circuitry 770 may be provided to fulfill the safety control and monitoring functions of the control module implemented with HW redundancy. The safety I/O circuitry 770 may also provide a redundant connection to both processors on the ASC. Implementation of significant safety I/O may be provided by a hybrid controller/I/O class module.

An example hardware configuration of an I/O class temperature I/O module will now be discussed, without limitation. In this example, only a single temperature module may be necessary for the control module to operate, but up to seven temperature I/O modules are supported by a control module. A temperature module may implement Type-k thermocouple-based temperature detection using two pairs of redundant thermocouples. This temperature module may be currently offered in a Class I, Div 2 or Div 1 enclosure. The Ethernet port on this module may be Type C, designed to consume power from other modules. Safety I/O may be implemented on this module, including redundant Type-k thermocouple inputs. The thermocouples may be wired during manufacturing. These temperature modules may be mounted into a thermowell and connected to the PFRN physical layer network via Ethernet cable.

An example hardware configuration of an I/O class ignition module will now be discussed, without limitation. In this example, an ignition I/O module may handle ignition and flame detection through ionization for the pilot and main burners. The ignition I/O module may also have a valve output for controlling a pilot. Ignition I/O modules may be added to the system to add more pilots. Ignition I/O modules may be installed in a burner housing if using the ordinary location enclosure. Alternatively, ignition I/O modules may be installed in an appropriately zoned or otherwise configured enclosure.

An example hardware configuration of an I/O class flame detection I/O module will now be discussed, without limitation. In this example, the flame detection I/O module may connect to a flame rod or external coil ion terminal, depending on the configuration. A Kanthal rod may be placed directly in the pilot flame and connected to this input. The pilot assembly may be grounded for the flame detection to function properly. Input may be protected from high voltage and can be connected in series with the high voltage terminals of an external ignition coil, allowing a single flame-rod to be used for both ignition and flame detection. A 65 VAC signal may be applied to the flame rod. The source impedance may be very high so there is virtually no danger of sparking. The negative terminal is the ground return for flame detection. The primary of the ignition coil may be connected to the flame detection I/O module. In this example, the 12/24 VDC input power may be applied for 1 ms and turned off for 50 ms while sparking.

Figure 8:
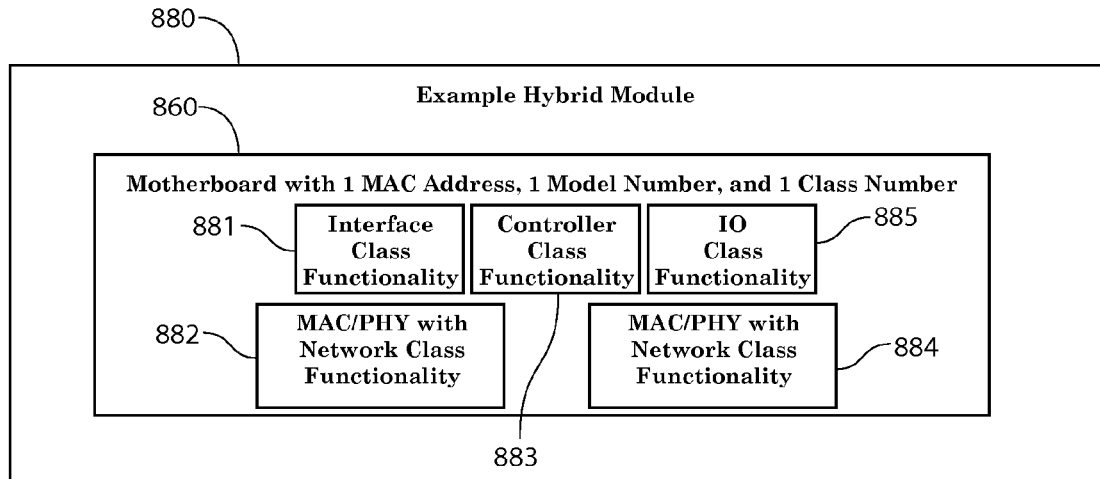
FIG. 8 is a block diagram view of an illustrative hybrid module, according to an embodiment of this disclosure.

Referring additionally to the block diagram of FIG. 8, a hybrid module will now be discussed in greater detail. The block diagram of FIG. 8 illustrates a model architecture of a hybrid module 880. Substantially all hybrid modules 880 may include a motherboard 860. Hybrid modules 880 may additionally include network class components 882, 884, interface class components 881, controller class components 883, and/or I/O class components 885. The hybrid module may incorporate elements from more than one class assimilated in a single, integrated module, virtually eliminating the need for networking cables to connect the different classed components together.

A hybrid module may be designated with and/or identifiable using a single model number and/or MAC address. A hybrid module may also have a single class assigned to it for the purposes of network identification, which may be determined by the following hierarchy: controller class (if present); then interface class or I/O Class (if present); the network class. Hybrid modules can include functionality of adjacent modules in the hierarchy of the distributed network system. Thus, hybrid modules generally cannot include interface class functionality and I/O class functionality without also providing controller class functionality. Network class functionality is virtually always optional depending on whether the hybrid module connects to other modules on the specified network.

In one embodiment, six types of hybrids are possible. A hybrid module may be provided with an interface class, controller class, I/O class, and optionally network classes, which will identify as a controller class. A hybrid module may be provided with an interface class, controller class, and optionally network class, which will identify as a controller class. A hybrid module may be provided with a controller class, I/O class, and optionally network class, which will identify as a controller class. A hybrid module may be provided with an interface class and network class, which will identify as an interface class. A hybrid module may be provided with a controller class and network class, which will identify as a controller class. A hybrid module may be provided with an I/O and network class, which will identify as an I/O class.

Figure 9:
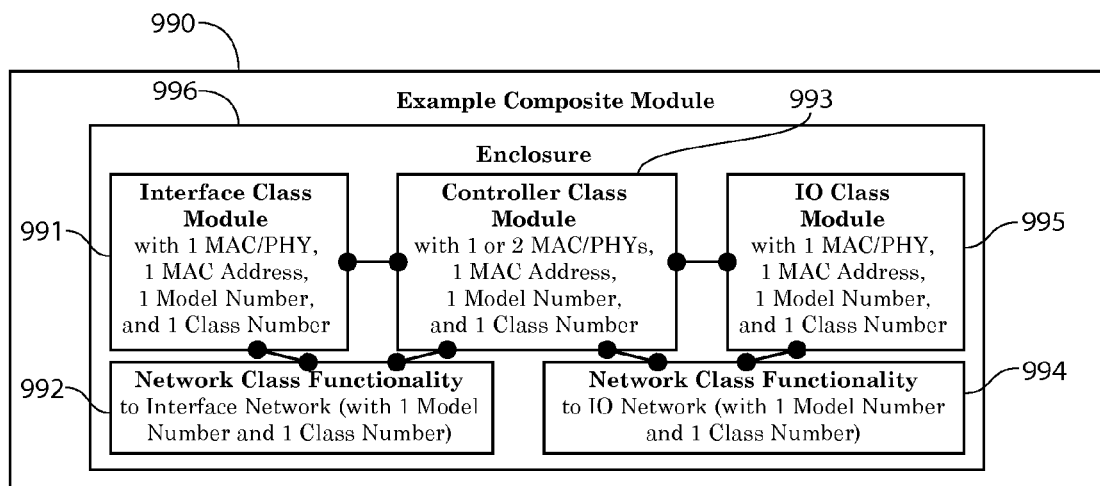
FIG. 9 is a block diagram view of a composite module, according to an embodiment of this disclosure.

Referring additionally to the block diagram of FIG. 9, a composite module 990 will now be discussed in greater detail. The block diagram of FIG. 9 illustrates a model architecture of a composite module 990. Composite modules 990 may include network class modules 992, 994, interface class modules 991, control class modules 993, and/or I/O class modules 995. The composite module may include a collection of discrete modules networked together and housed in a single enclosure 996. The sub-module enclosures are typically not included in the larger enclosure. A logical composite module may be provided as a collection of discrete modules without a common location inside a single enclosure.

A composite module may differ from a hybrid module in that the sub-module electronics are networked together inside of the product enclosure and each sub-module has its own unique model number and MAC address. Each sub-module of the logical or composite module may identify itself separately on the network. Network class modules that do not have a MAC address might not identify themselves on the network.

Similar to hybrid modules, composite modules generally can include adjacent modules in the hierarchy of the distributed network system. Thus, composite modules generally cannot include interface class functionality and I/O class functionality without also providing controller class functionality. Network class functionality is virtually always optional depending on whether the composite module connects to other modules on the specified network.

In one embodiment, six types of composites are possible. A composite module may be provided with interface class, controller class, I/O class, and optionally network class modules. A composite module may be provided with interface class, controller class, and optionally network class modules. A composite module may be provided with controller class, I/O class, and optionally network class modules. A composite module may be provided with interface class and network class modules. A composite module may be provided with a controller class and network class modules. A composite module may be provided with an I/O and network class modules.

Illustrative hardware architectures on which the distributed networking system may be operable will now be discussed. Modules in the distributed networking system of this disclosure may include one or more printed circuit board assemblies (PCBAs). For example, the modules may include a motherboard designed for the purpose of the module and a core that provides some generic processing and safety functionality. The system may be divided in this manner to simplify design and certification for future modules. Using the core processor architecture virtually eliminates duplicative design tasks, such as being redocumented, recertified, and retested. Only the application specific firmware and motherboard hardware will need to pass through this process. Additionally, separating the motherboard and core circuitry onto separate PCBAs may advantageously reduce cost. Cores generally use multiple layers, high speed dielectric, large quantities of ground pin vias, and other features, making the cores relatively expensive per unit area. Motherboards may be significantly larger due to the higher component count and larger size of the components, but may have lower requirements for expensive electronic components and high speed dielectrics. Embodiments that separate the core and the motherboard allow a larger motherboard to be implemented using a cheaper process.

Motherboards may implement safety critical circuitry in a redundant fashion such that a failure of one half of the circuit will not result in an unsafe condition for the target application, for example, by connecting safety critical motherboard I/O to I/O pins on both processors of the safety core. The motherboards may include a ROM, such as an EEPROM, including a motherboard descriptor. The ROM may need to be validated by the firmware running on the safety core before it will set any I/O pins to a state other than tri-state. Substantially all I/O circuitry on motherboards may be designed to default to a safe state for the target application when the controlling I/O pins are tri-stated. Connectors on motherboards may be designed to pass required pull tests for intrinsic safety.

The processors included in some modules may be mounted on a PCBA known as a core. As examples, three types of cores will be discussed, without limitation, a user interface core ("UIC"), symmetrical safety core ("SSC"), and asymmetrical safety core ("ASC").

Figure 10:
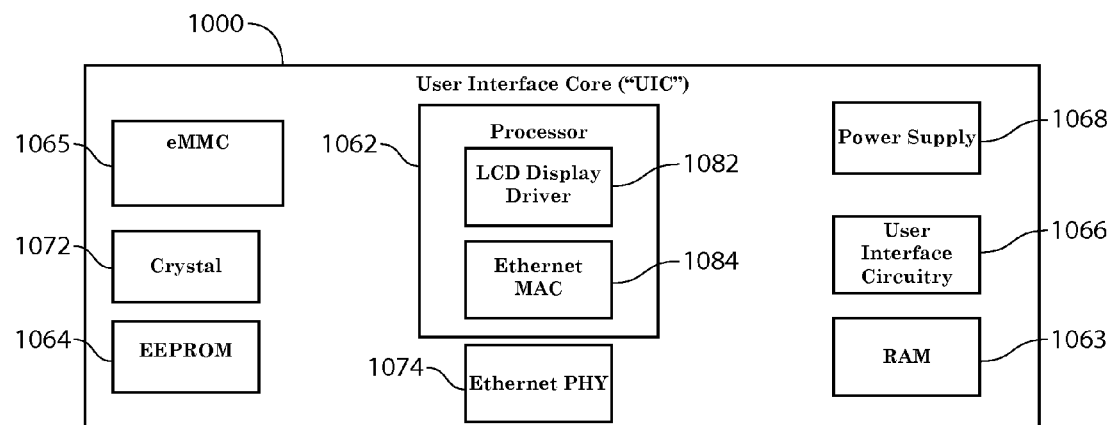
FIG. 10 is a block diagram view of an illustrative user interface core, according to an embodiment of this disclosure.

Referring additionally to FIG. 10, the UIC will now be discussed in more detail. The UIC may be a single board computer which is designed to run an operating system, such as Linux, allowing it to easily perform networking, file system access, and present a graphical user interface. The UIC may include only a single processor since it does not need to perform safety critical tasks. The UIC 1000 may include a processor 1062, ROM 1064 such as an EEPROM, RAM 1063, eMMC 1065, user interface circuitry 1066 and power supply 1068. The processor 1062 may include a display driver 1082, such as an LCD display driver, and an Ethernet Mac 1384. The UIC 1000 may additionally include a crystal 1072 and Ethernet PHY 1074. Skilled artisans will appreciate additional embodiments of the UIC with additional, substitute, or omitted components after having the benefit of this disclosure.

Figure 11:
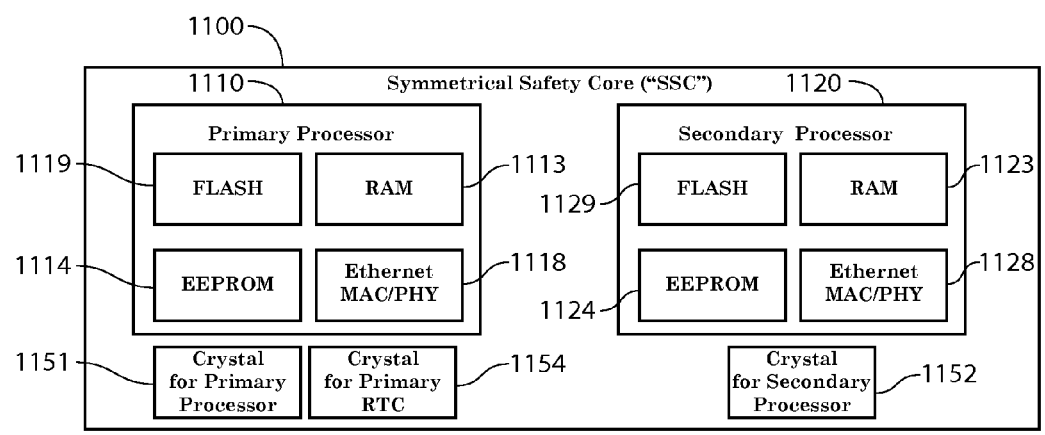
FIG. 11 is a block diagram view of a safety core, more particularly, a symmetrical safety core, according to an embodiment of this disclosure.

Referring additionally to FIG. 11, the SSC will now be discussed in more detail. The SSC may include two identical processors to implement 1oo2 safety voting logic, for example, as discussed in IEC61508. Skilled artisans will appreciate additional safety voting login includable by the SSC, for example and without limitation, 2oo3. Additional voting structures may include, without limitation, 1oo2D, 2oo2, 1oo1 D, 2oo2D, 2oo4D, and other voting architectures. Various voting logic may advantageously provide safety features of safety integrated systems, including redundancy, triple modular redundancy, quadruple modular redundancy, diagnostics, or other safety features that would be apparent to a person of skill in the art.

Both processors may have an Ethernet MAC/PHY allowing modules using this core to talk on separate networks. The SSC 1100 may include a primary processor 1110 and a secondary processor 1120. The primary processor 1110 may include RAM 1113, a ROM 1114 such as an EEPROM, Ethernet MAC/PHY 1118, and flash memory 1119. Similarly, the secondary processor 1120 may include RAM 1123, a ROM 1124 such as an EEPROM, Ethernet MAC/PHY 1128, and flash memory 1129. The SSC 1100 may additionally include crystals, including a crystal 1151 for the primary processor 1110, a crystal 1152 for the secondary processor 1120, and a crystal 1154 for the primary RTC.

Figure 12:
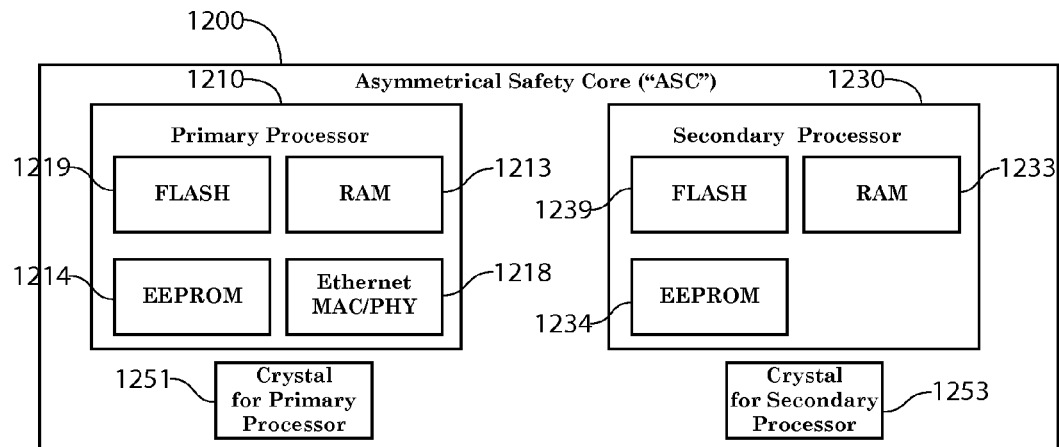
FIG. 12 is a block diagram view of a safety core, more particularly, an asymmetrical safety core, according to an embodiment of this disclosure.

Referring additionally to FIG. 12, the ASC will now be discussed in more detail. The ASC may include two slightly different processors to implement 1oo2 safety voting logic. Skilled artisans will appreciate additional safety voting login includable by the ASC, for example and without limitation, 2oo3. Additional voting structures may include, without limitation, 1oo2D, 2oo2, 1oo1D, 2oo2D, and other voting architectures.

Only one processor may include an Ethernet MAC/PHY allowing modules using this core to talk on a single network. The ASC 1200 may include a primary processor 1210 and a secondary processor 1230. The primary processor 1210 may include RAM 1213, a ROM 1214 such as an EEPROM, Ethernet MAC/PHY 1218, and flash memory 1219. The secondary processor 1230 may include RAM 1233, a ROM 1234 such as an EEPROM, and flash memory 1239. The ASC 1200 may additionally include crystals, including a crystal 1251 for the primary processor 1210 and a crystal 1253 for the secondary processor 1230.

As discussed above, modules may include network ports. The network ports may provide visual feedback, for example, via LED indicators to report a status. In this example, a lit indicator may report that a port is powered when lit. Additionally, an indicator may report a network connection, which may remain lit when a network connection is present and blink for network traffic. The network ports may use modular connectors for networking, for example, 8P8C (RJ45). The connectors can be wired in T568A with straight configurations being supported interchangeably by the PFRN physical layer and protocol. In an embodiment of this disclosure, the connectors can be wired in T568A and/or T568B, with straight and/or crossover configurations respectively, being supported interchangeably by the PFRN physical layer and protocol. The propagation time through a single Ethernet switch optimally will not be longer than 120 us and the total number of cascaded switches on a given network segment optimally will not exceed three. This will ensure that the maximum propagation delay between two modules is unlikely to exceed 120 us×3=360 us, with a roundtrip delay of 360 us×2=720 us plus however long a slave module takes to respond.

The network ports may be configured to use the safety PFRN protocol provided by this disclosure, and thus can be designed such that modules will not communicate over a regular Ethernet connection. An enclosure may be provided to at least partially enclose one or more modules of the system. The enclosure for a given model may provide an adequate level of ingress protection and may carry an appropriate hazardous locations rating, as required by the intended application for that model.

Figure 13:
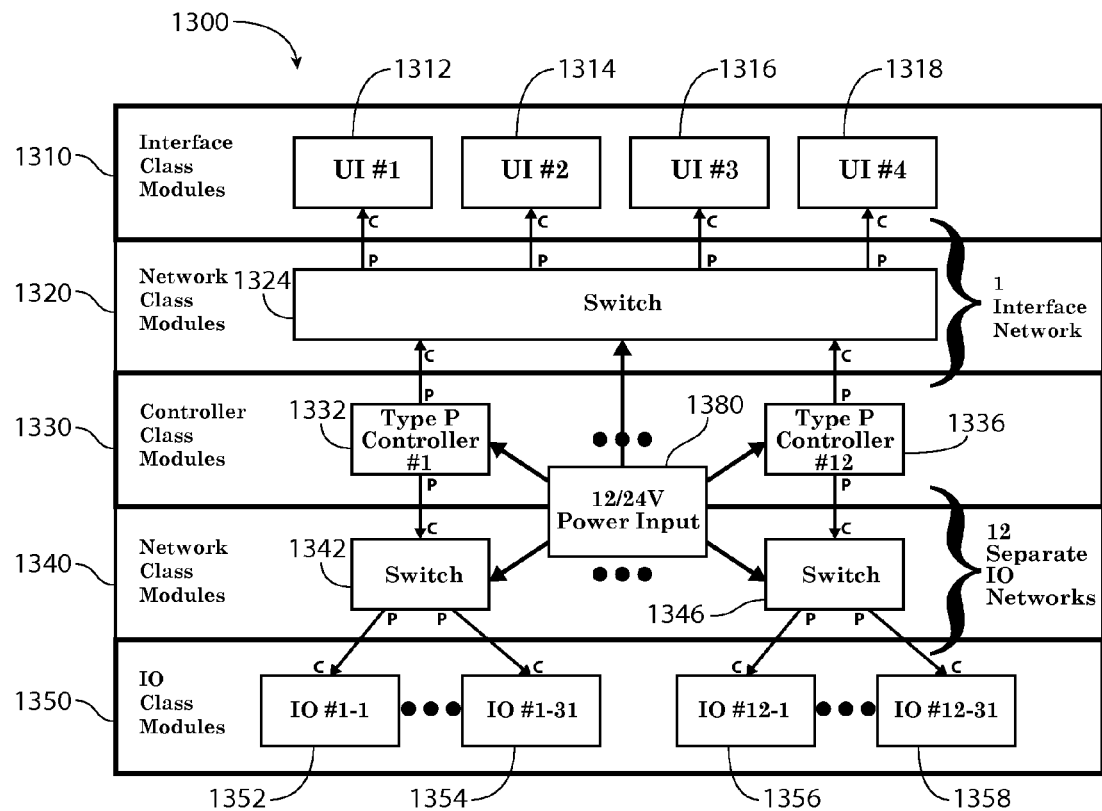
FIG. 13 is a block diagram view of an illustrative system hierarchy with power delivery, according to an embodiment of this disclosure.

Referring additionally to FIG. 13, power distribution aspects via the distributed networking system will now be discussed. Referring to the illustrative system 1300 of FIG. 13, the modules including power distribution aspects will now be discussed in greater detail. A module may be a collection of circuit boards, embedded software, power delivery components, and/or other components or devices packaged together, for example, in an enclosure. In one embodiment, the module may be marked with a model number and serial number. Modules may have network ports to connect to the PFRN physical layer, communicate with other modules, and transmit power. The modules on the network may fit different classes depending on function. These classes may include the network class modules 1320, 1340, user interface class modules 1310, control class modules 1330, and input/output (I/O) class modules 1350.

Network class modules 1320, 1340, such as switches 1324, 1342, 1346, may perform similarly to Ethernet switches. These modules may provide additional Ethernet ports to facilitate the connection of more modules, help route network traffic, and provide power to the network. There is virtually no limit on the number of network modules includable in the system. However, protocol timing may be affected if numerous networking modules are cascaded on a given network. These network class modules 1320, 1340 generally do not need to be safety certified because they are part of a "black channel." In less complicated networks, it is possible that no network class modules 1320, 1340 may be required, with other modules connecting directly to each other.

Interface class modules 1310 may implement user interfaces and may be similar to HMIs used in PLC-based control systems. Interface class modules 1310 may be used to monitor the system status, configure system settings, log data, update firmware, and perform other functions. In one embodiment, up to four interface class modules 1312, 1314, 1316, 1318 can exist in a given system. Skilled artisans will appreciate additional embodiments with varying capacity for interface class modules. When connected to the safety network, interface class modules 1310 are typically not safety certified because they generally do not perform any safety critical tasks. Interface class modules may receive power via the network.

Controller class modules 1330 may implement the safety state machine and include substantially all of the settings and configuration information required to perform their assigned function. Controller class modules 1330 typically include redundant processors and other hardware circuits to ensure that a hardware failure will not lead to an unsafe state. In one embodiment, up to twelve control class modules, including control modules 1332, 1336, can exist in a given system. Skilled artisans will appreciate additional embodiments with varying capacity for control class modules 1330. When connected to the safety network, control class modules 1330 are almost always safety certified for the application that they are intended for. Some control class modules 1330 may transmit power with data, typically existing in two types: Type P which produce power for the Safety Network to use and Type C which consume power from the Safety Network. In systems that distribute power, most control class modules may be Type P.

I/O class modules 1350 may be designed to perform a specific I/O task repetitively and in a trusted manner. I/O class modules 1350 may interface with accessories connected with a control class module 1330. Without communication from a control class module 1330, these I/O class modules 1350 will virtually always sit idle in a safe state. I/O class modules 1350 typically include redundant processors and other hardware circuits to ensure that a hardware failure will not lead to an unsafe state. In one embodiment, up to 31 of I/O class modules 1350, including I/O modules 1352, 1354, 1356, 1358, can exist per control module 1332, 1336. In this embodiment, a maximum of up to 372 I/O modules may be included in a given system. Skilled artisans will appreciate additional embodiments with varying capacity for interface class modules 1310. I/O class modules 1350 are typically safety certified but do not have an application specific safety state machine. I/O class modules may receive power via the network.

A power input 1380 may be provided to implement the power distribution methodology of the PFRN physical layer. Power distribution technologies may be based on, but is not required to be compliant with, the Power over Ethernet standard IEEE 802.3at. For example, power distributed over the Ethernet network by the distributed networking system may be provided at 36 VDC, as indicated by the arrows extending outwardly from the power source 1380. The power input 1380 on the network may virtually always be provided by a control class module 1330. This input voltage to the control modules 1332, 1336 is typically 12 or 24 VDC to maintain compatibility with commonly used industrial power supplies.

Virtually all network class modules can be optionally powered from a separate 12/24 VDC power source. It is possible for a network class module to be powered from multiple sources. For example, network class modules may be powered from a 12/24V input and also from one or more Ethernet ports, aggregating the received power. Power ports may be isolated to reduce ground loop issues. Virtually every network port on the PFRN physical layer can be classified as either an Ethernet power producer or an Ethernet power consumer.

The block diagram of FIG. 13 illustrates a typical network power distribution scenario in which only Type P control class modules are used. However, skilled artisans will appreciate additional network power distribution scenarios, for example, in which only Type C controller class Modules are used. In another example, a mixture of Type P and Type C control class modules may be used on the same network.

Generally, for Type P control class modules, each network port is an Ethernet power producer, which may require a separate 12/24 VDC power input to supply power to the network. For Type C control class modules, generally each network port is an Ethernet power consumer. Typically for interface and I/O class modules, the network port is an Ethernet power consumer. A separate power supply may not be required, but may be included. For network class modules, typically various network ports may be included that are Ethernet power consumers or Ethernet power producers. A separate 12/24 VDC power input may be included on these modules, with connection to a power source being optional and/or depending on the installation environment.

The power distribution hardware may include fuses and/or circuit breakers to virtually eliminate or mitigate overcurrent. Network ports may employ a first type of fusing for power producers, for example, using a thermal fuse that may automatically reset after a period of time. These fuses may optimally be set at about 400 mA. Network ports may employ a second type of fusing for power consumers, for example, using non-resettable fuses that blow permanently if their current limit is exceeded. These fuses may optimally be set at 500 mA.

Connections via the PFRN physical layer may be made via cabling that can transmit data and/or power. For example, connections via the PFRN physical layer may be made via Ethernet cabling. As a further example, Cat-5e and Cat-6 cables may be used, as these cables typically have a current carrying capacity of around 350 mA. In embodiments wherein modules operate at 36 VDC, a given power producer port can supply about 12.6 W. Given a typical total cable resistance of 20 Ohms for 100 m of Cat-5e cable, up to 2.45 W of power may be dissipated in the Ethernet cables themselves, meaning a typical power consumer port may not draw more than 10.15 W. In one embodiment, network communication may remain reliable at up to 330 ft (100 m) of Ethernet cable between modules.

The networking protocol of the safety network will now be discussed in greater detail. Additionally, the protocol-based safety network will now be discussed in greater detail. The protocol may be adapted for a modular network system, for example, including control modules, interface modules, I/O modules, and optionally network modules. The safety network may operate via Ethernet, which may include one or more standard media layer protocols. The network system may additionally include one or more proprietary protocols, such as a PFRN protocol, operable on the transport layer (layer 4) and higher. Optionally, the protocol may include a proprietary structure for the network layer (layer 3).

In one embodiment, the PFRN protocol may share some similarities with industry standard protocols, for example, openSAFETY. However, as will be apparent after having the benefit of this disclosure, the PFRN protocol improves over industry standard protocols by solving some of the deficiencies of present implementations. The PFRN protocol may include similar and varied aspects shared with standard protocols, such as CRC polynomials, frame length restrictions, and frame duplication schemes. However, the PFRN protocol improves over standard protocols by including broadcast support, sequence numbers in place of timestamps, serial numbers usable as network addresses, and custom protocol variants. The PFRN protocol may further support addition of data to frames, for example, data relating to product ID fields and firmware bundle numbers. The PFRN protocol may additionally reduce or eliminates the bloated data encapsulation and inefficient protocol stack that are problematic in existing protocol technologies.

The PFRN protocol may include a protocol stack that improves over the complicated Open Systems Interconnection (OSI) model. The PFRN protocol stack advantageously organizes network layers to simplify implementation over the OSI model. Comparing it to the OSI model, the PFRN may prove a compressed protocol stack. For example, many layers of the OSI module may be combined via the PFRN protocol stack into a single implementation for faster execution of code, compactness of code, and other advantages over existing technologies. In some embodiments, the PFRN protocol stack may take guidance from principles found in IEC61508 and IEC61784. However, the PFRN protocol advantageously adds factory set MAC addresses and the ability to broadcast safety data. Hard coded MAC addresses enable easy discovery of modules being added to a system and a substantially guarantees uniqueness. Broadcast safety packets enable substantially safe communication between multiple modules operating to form an appliance. The PFRN protocol stack also advantageously provides bandwidth efficiency by reducing amount of point-to-point addressed communications packets.

In one embodiment, the safety network of this disclosure includes an at least partially proprietary transport layer. For example, the proprietary nature of the safety network may replace or supplant standard transport layer protocols such as transmission control protocol (TCP), user diagram protocol (UDP), datagram congestion control protocol (DCCP), stream control transmission protocol (SCTP), and other that would be apparent to skilled artisans. In some implementations, the transmission layer of this protocol of the safety network may operate with standard network layer protocols, for example, via IP. In implementations of the safety network of this disclosure, the transmission layer of this protocol may operate with at least partially proprietary network layer protocols, which may replace or supplant standard network layer protocols known by skilled artisans. The safety network may operate the at least partially proprietary transport and/or network layer protocols via established data link layers, for example, using Ethernet connections and media access control (MAC) addressing.

The protocol discussed throughout this disclosure may facilitate communication of data to appropriate application processes on various modules of the distributed networking system via a safety state environment. The data may undergo statistical multiplexing from different application processes, for example, via data packets, with added source and destination information in a header of transport layer data packets. The safety network protocol may additionally provide substantially reliable communication between modules and optionally congestion avoidance.

The protocol may be at least a SIL3 rated "black channel" network based on Ethernet, which may facilitate system installation and expansion. The protocol may include support for power distribution based on IEEE 802.3at power over Ethernet (PoE) standards, as discussed above. The protocol may facilitate communication across a logically defined network, which may include multiple physically discrete networks. Logical and physical modules may be defined by an address, such as a MAC address and/or proprietary descriptors, which may correlate with the class of each module.

The modules may include electronically embedded information as descriptors, which may share information about the module using the PFRN protocol. The descriptors may include blocks of memory to store details and/or flags. The blocks may be offset by a defined or variable number of bytes or other memory unit. Portions of a descriptor may be write-protected to disallow modification after deployment. Descriptors may include electronic information relating to a motherboard, core processor, bootloader, firmware, calibration coefficient, and other component or condition. In one embodiment, the PFRN network address may be included in at least one write-protected descriptor. Flags may be set and/or modified in response to conditions present in and/or detected by the module. Data can be over the PFRN physical layer via the PFRN protocol.

Data packets and other communications may be directed through intermediary modules to decrease the likelihood of an unsafe condition. For example, data communicated from an interface module to an I/O module can be received, analyzed, and communicated by an intermediary control module to verify compliance with safety standards. The PFRN protocol may support multiple control modules to distribute compliance verification calculations, include voting logic, and/or provide redundancy in compliance verification to provide a safety state environment.

The safety network may facilitate remote updating of devices communication via the protocol. For example, the protocol may permit remote upgrading of firmware in field deployed modules or devices. The protocol may additionally facilitate detection of incompatible or uncertified firmware in connected modules or devices, providing instructions to disable such detected modules to reduce the likelihood of continued operation in an unsafe condition. The information may be at least partially discernable via the descriptors.

The protocol may operate on the safety network or PFRN physical layer, to provide a safety state environment. The PFRN protocol, operable on the PFRN physical layer, may provide a failsafe in the event of virtually any fault condition. In one embodiment, the PFRN physical layer may support up to 4 interface modules, 12 control modules, and 372 I/O modules in an individual network. There is virtually no limit to the number of network modules provided via the protocol and multiple network modules can be connected directly together.

Networks may be isolated from each other by control modules, which typically have multiple separate network interfaces built into them—interfaces for interface type modules and other interfaces for I/O type modules. Controller type modules are designed to not route packets including safety data from one network section to another to prevent unsafe conditions. Skilled artisans will appreciate additional embodiments, in which the controller type modules may route packets among the networks, for example, packets including non-safety data, such as firmware update packets.

Descriptors may have multiple instances within a given module which are used for various purposes. The following illustrative descriptors are provided in the interest of clarity and without limitation: motherboard descriptor; core processor descriptor; bootloader descriptor; firmware descriptor; firmware bundle descriptor; settings descriptor; and factory calibration descriptor. Each descriptor may include data for a variety of fields. Descriptors may be stored on the memory included by the motherboard, in core processor flash, in external memory, or in other locations that would be apparent to a person of skill in the art. Examples of some fields used by descriptors are provided below, without limitation.

An illustrative field includable by a descriptor relates to a bill of materials (BOM) version number. Each motherboard and each core may have an associated bill of materials. This field may include the version number for the bill of materials which can be used to verify compatibility with a given firmware version both on system boot and also during the firmware update mechanism. This field may include data relating to, without limitation, a revision and BOM numbers.

An illustrative field includable by a descriptor relates to a bootloader version number. The bootloader version may uniquely identify a particular version of bootloader for a given core type. If a core includes multiple processors, the bootloader version in each processor will virtually always match, ensuring bootloader compatibility. This field may include data relating to, without limitation, revision and build numbers.

An illustrative field includable by a descriptor relates to a core number and name. Each core may have a name encoded as a number. This field may include data relating to, without limitation, the core number and/or core name.

An illustrative field includable by a descriptor relates to a core serial number. Virtually all safety cores have a serial number, which may be embedded. The serial number may be assigned to a core at the time that the core is manufactured, and may be unique for each core that is manufactured. In one embodiment, the serial number may also be used as a MAC address for the PFRN protocol, where core serial numbers may have the multicast bit set to zero to not consume a valid MAC address. Core serial numbers and model serial numbers can overlap.

An illustrative field includable by a descriptor relates to a cyclic redundancy check (CRC), which will be understood by skilled artisans. The CRC may be used to verify that the content of a descriptor has not been corrupted. The CRC field may be used in combination with the Ethernet CRC algorithm.

An illustrative field includable by a descriptor relates to a descriptor identifier, which may uniquely identify a descriptor so that it cannot be accidentally mistaken for a different descriptor type. This field may include data relating to, without limitation, a descriptor identifier.

An illustrative field includable by a descriptor relates to a factory calibration format number, which may identify a particular version of the factory calibration structure associated with a given model number. The firmware may use this information to determine if a given factory calibration descriptor is compatible. If incompatible, the system may convert the information to a version that is compatible or revert to factory defaults settings. This field may include data relating to, without limitation, a factory calibration format number representing the revision number of the factory calibration format for the associated model.

An illustrative field includable by a descriptor relates to a firmware bundle number, which may represent a package of firmware which has been tested and is known to work on virtually all currently shipping modules as of the date of the public release of the bundle. A given version of firmware for a given module may be included in multiple bundles. The firmware bundle number may include a region designation. In one example, the firmware bundle descriptor may be used to determine which firmware versions are tested to be compatible with each other and/or certified through a certification body to be safe. The bundle may be embedded in the PFRN protocol to ensure that only compatible devices will communicate safety data. Other types of data, such as device enumeration packets and/or firmware update packets, may be communicated between devices regardless of the bundle. Determination of compatibility in a firmware bundle descriptor may advantageously provide a path to upgrade/downgrade devices that are running incompatible firmware to a version that is compatible.

An illustrative field includable by a descriptor relates to a firmware settings format number, which may identify a particular version of the settings structure for a model number. The firmware may use this information to determine if a given firmware settings descriptor is compatible. If incompatible, the system may convert it to a version that is compatible or it will revert to factory defaults settings.

An illustrative field includable by a descriptor relates to a firmware version, which may uniquely identify a particular version of firmware for a given module. If a module includes multiple processors, the firmware version in each processor will virtually always match, except for the processor number field, to ensure firmware compatibility. A given version of firmware for a given module may be included in multiple bundles. This field may include data relating to, without limitation, revision and build numbers.

An illustrative field includable by a descriptor relates to an image. The image may be an executable program. The bootloader, module firmware, and module settings may be stored in this format, which can be core and/or module specific.

An illustrative field includable by a descriptor relates to an image block of CRCs, which may include a variable number of CRCs. Each CRC may be calculated for the data contained in the image field. Various CRCs may correspond to the various blocks of the image. The CRCs may be calculated until the entire image has been processed.

An illustrative field includable by a descriptor relates to an image length, which may be used to specify the length of an image. In one embodiment, the image length field may be a 64-bit, 32-bit, 16-bit, or other number representing the image length in bytes.

An illustrative field includable by a descriptor relates to a length of image block CRCs, may be used to specify the length of the "image block of CRCs" field. This field may be a 64-bit, 32-bit, 16-bit, or other number with units of bytes.

An illustrative field includable by a descriptor relates to a manufacture test date, which may indicate the date on which the production test at the manufacturer was performed on the motherboard or the core. The data block may include a year, month, day-of-month, and/or other time designating fields. The data block may optionally include one or more reserved spaces.

An illustrative field includable by a descriptor relates to a manufacture test time, which may be the time at which the production test at the manufacturer was performed on the motherboard or the core. This field may include data relating to, without limitation, hour, minute, and second data, which may be encoded in an interpretable format.

An illustrative field includable by a descriptor relates to a model number, which may be embedded in each module in a ROM, for example, EEPROM, which is readable electronically over the network. The model number may be used to determine if various modules are compatible with each other at system startup and also to ensure that firmware updates are applied to only compatible modules.

The model number may include information regarding at least a model family, model variant, and SKU code. The model family information may relate to a group of modules that have similar purpose or function, for example, a module that measures temperature using thermocouples and a module that measures temperature using RTDs. The model variant information may identify a particular model within a family. The SKU code may define things such as enclosure options and the types of modules included in composite modules.

An illustrative field includable by a descriptor may relate to a module class number, which may be encoded as a number and embedded in each module in an ROM, such as an EEPROM. This field may be readable electronically over the network. The module class number may be used to determine if a module is located on the correct network segment.

An illustrative field includable by a descriptor may relate to a module serial number and/or MAC address. The module serial number may be embedded in a ROM, such as an EEPROM. For modules that include an Ethernet MAC, the serial number may be used as their MAC address instead of the default MAC address embedded in the Ethernet transceiver IC. These MAC addresses loosely comply with the requirements outlined in IEEE 802.3, but deviate in that the vendor codes are implemented in a custom fashion as modules of the system are not intended to be installed on the public internet.

An illustrative field includable by a descriptor relates to a processor number, which may represent the core processor number associated with a core descriptor. An illustrative field includable by a descriptor may relate to a geographic or political region intended for a module hardware or firmware. This code may ensure that hardware and firmware requirements that differ among regions are kept within the respective region.

An illustrative field includable by a descriptor may relate to a reserved space, which generally is a length of bytes reserved for future use. Optionally, the reserved space may be set to all zeros. The reserved space may vary in length depending on which descriptor is being referred to.

An illustrative field includable by a descriptor may relate to a XORed copy, which may include a copy other descriptor fields, including the CRC. The data in the XORed copy may be encrypted, hashed, or otherwise obfuscated. This field may guard against the potential failure other features to detect corruption of the data.

Figure 14:
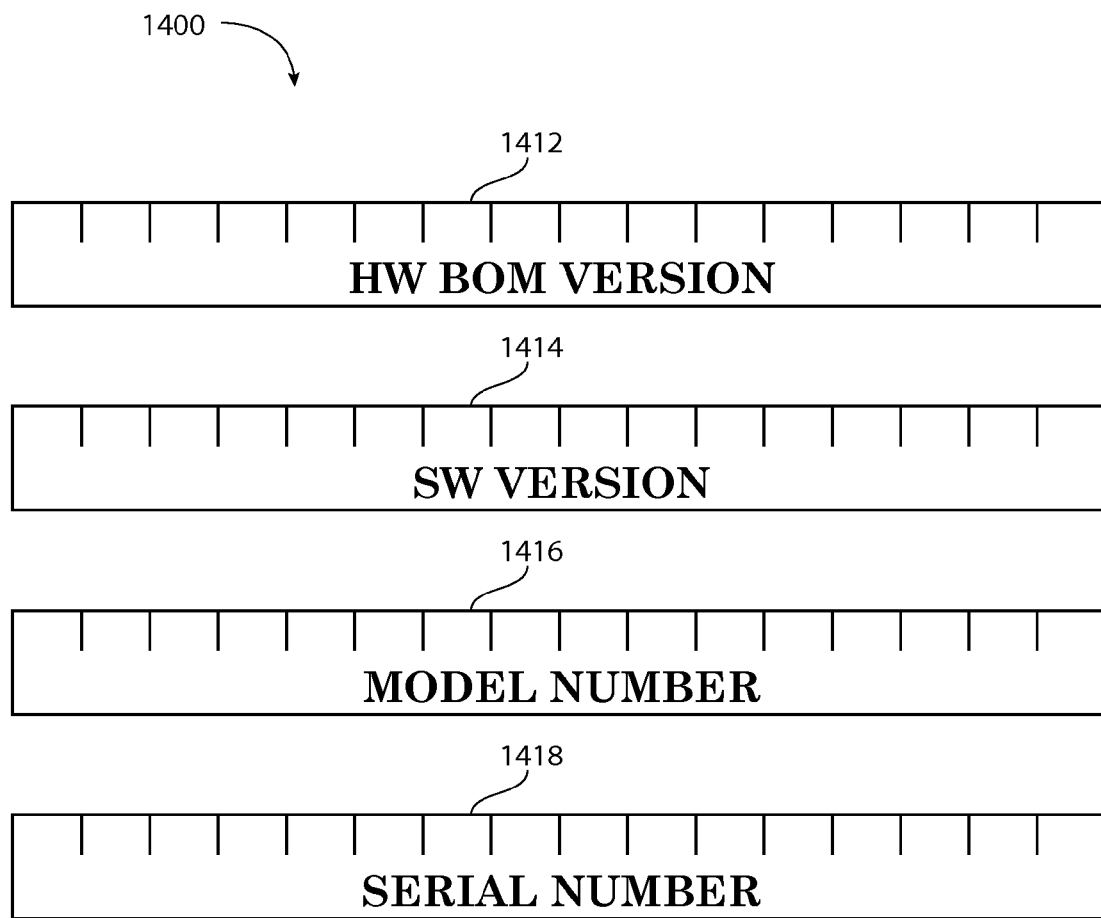
FIG. 14 is a diagram view of an example format for a descriptor, according to an embodiment of this disclosure.

Referring additionally to diagram 1400 of FIG. 14, an illustrative 64-bit block of data, which is an example format for a descriptor, will now be discussed in the interest of clearly describing a potential structure for a field. The term descriptor refers to a data structure which may hold many different pieces of data that can be related. The data block may include a first field 1412 (HW BOM VERSION), a second field 1414 (SW VERSION), a third field 1416 (MODEL NUMBER), and a fourth field 1418 (SERIAL NUMBER). Data blocks may additionally include one or more reserved spaces. The first field 1412 (HW BOM VERSION) may occupy the bits 63-48 of the block, and may provide the data for the related descriptor. The second data field 1414 (SW VERSION) may occupy the adjacent bits 47-32 of the block, and may provide the data for the related descriptor. The third field 1416 (MODEL NUMBER) may occupy the adjacent bits 31-16 of the block, and may provide the data for the related descriptor. The fourth field 1418 (SERIAL NUMBER) may occupy the adjacent bits 15-0 of the block, and may provide additional data for the related descriptor. Skilled artisans will appreciate alternative arrangements of data, use of reserved spaces, and lengths of fields and/or reserved spaces after having the benefit of this disclosure.

Illustrative modules will now be discussed, without limitation. The illustrative modules may include one or more descriptors. The fields included by each example of the illustrative modules, for example, in the descriptors, may provide information about the respective module. Each field of the descriptor in the illustrative module may be configured with a defined or variable byte length. Each field of the descriptor may be offset by an appropriate number of bytes. Each of the descriptors may include a byte length respective to the descriptor.

Modules that include a processor may have an EEPROM mounted on the motherboard which stores information about that motherboard in a data structure called a "motherboard descriptor." This structure may be programmed at the factory and then the write enable pin on the EEPROM is disabled to prevent the structure from being modified intentionally or otherwise. The motherboard descriptor may include the following fields, without limitation: motherboard descriptor identifier, model number, region code, module class number, BOM version number of motherboard, model serial number, manufacture test date of motherboard, manufacture test time of motherboard, reserved space, CRC, and a redundant copy.

Modules that include a core may have some EEPROM inside each processor on the core, which may store information about that core in a data structure called a "core processor descriptor". The core processor descriptor may include the following fields, without limitation: core processor descriptor identifier, core number, processor number, BOM version number of core, core serial number, manufacture test date and time, reserved space, and CRC.

Modules may include a bootloader and associated information stored in flash memory of each core processor, which may be programmed at the factory and then write protected so that it cannot be modified in the field. The specific device and address at which this structure is stored may not need to be constant so long as the ROM bootloader for the processor can find it. More than one bootloader descriptor may exist in a given device to allow a factory programmed bootloader to be locked in a protected block of memory for recovery purposes. The second field patched bootloader may be loaded into a field programmable block of memory to correct an error in the factory bootloader or in the event that additional functionality needs to be added to the bootloader in the future.

In one example, the factory boot loader may be configured as read-only to prevent a unit from becoming inoperable, or "bricked," during a firmware update or other erroneous write event. The motherboard descriptors and core descriptors may also be configured as read-only to prevent software from being able to run on hardware that it is not intended to run on, since failing to prevent this could result in an unsafe condition. Items may be marked as read-only using hardware so that it is not possible for software to mark the items as writable. For example, a write protect pin or an OTP write protect register may be included with module and/or a memory device.

The bootloader descriptor may include the following fields, without limitation: bootloader descriptor identifier, core number, processor number, bootloader version number, reserved space, image length of bootloader, length of image block CRCs, image block CRCs, and descriptor CRC.

Modules may include firmware and associated information, such as a firmware descriptor stored in flash memory of each processor, which may be programmed at the factory. The firmware descriptor may be upgraded in the field. The specific device and address at which this structure is stored does not need to be constant so long as the flash bootloader for the processor can find it. The firmware image may be embedded within the descriptor and is generally intended to be executed in place. Some bootloaders may support compressed firmware in the firmware descriptor.

The firmware descriptor may include the following fields, without limitation: firmware descriptor identifier, model number, core number, processor number, firmware version number, firmware settings format number, reserved space, image length of firmware, length of image block CRCs, image block CRCs, and descriptor CRC.

Modules may include firmware bundles and associated information, such as a firmware bundle descriptor stored in flash memory of each processor, which may be programmed at the factory. The firmware bundle descriptor may be upgraded in the field. The specific device and address at which this structure is stored does not need to be constant so long as the flash bootloader for the processor can find it. The firmware bundle descriptor may include the following fields, without limitation: firmware bundle descriptor identifier, region code, firmware bundle number, reserved space, and descriptor CRC.

Modules may include firmware settings and associated information, such as a firmware settings descriptor, which may be programmed at the factory. The firmware settings descriptor may be upgraded in the field. The specific device and address at which this structure is stored does not need to be constant so long as the firmware for the processor can find it. The firmware settings descriptor may include the following fields, without limitation: firmware settings descriptor identifier, model number, firmware settings format number, reserved space, image length of settings, length of image block CRCs, image of settings, image block CRCs, and descriptor CRC.

Modules may include factory calibrations and associated information, such as a factory calibration descriptor stored via the motherboard. The firmware descriptor may include the following fields, without limitation: factory calibration descriptor identifier, model number, factory calibration format number, reserved space, image length of calibration data, length of image block CRCs, core serial number, images, image block CRCs, descriptor CRC, and a redundant copy. For the factory calibration descriptor, the image of calibration data field may be not fixed across the distributed networking system. Virtually no restriction on how a specific module stores or interprets calibration data may be required. However, modules can be assumed to implement linear calibration for I/O unless their software specification indicates otherwise. An illustrative default linear calibration for the image of calibration data field from the descriptor may include, without limitation, slope scaling factors and/or offsets. Various factors may be used for this linear calibration, including, without limitation slope scaling factor and offset.

Operating instructions and firmware will now be discussed. Firmware is generally an embedded software instruction set for an electronic component, and is often upgradeable. Some operating instructions may only be loaded at the factory or point of manufacture by qualified staff. Other software, including some firmware, may be field updatable by anyone who has access to the software using interfaces built into the systems. Field updatable firmware and operating instructions may be broadcast via the PFRN safety network.

As an example using the distributed networking system of this disclosure, an interface class module can be used to perform a field update of the bootloader, firmware, and/or settings stored in all or some connected modules. Updates may be substantially safely performed and can be restarted to avoid permanent inoperability ("bricking"). Other descriptors may only be loaded during initial production to reduce the likelihood of creating an unsafe condition.

Bundle files may be provided to one or more module. Bundle files may be compressed, encrypted archives containing multiple files. Bundle files may include exclusively one type of descriptor or may include multiple types of descriptors substantially simultaneously. Bundle files may include exclusively factory descriptor templates, exclusively bootloaders, exclusively firmware, or exclusively settings. In some embodiments, multiple types of files may not be combined into the same bundle file. In alternative embodiments, multiple types of files may be combined in the same bundle file. In one example, provided without limitation, a bundle file may include bootloaders and firmware. Bundle files may be compressed, encrypted, and/or protected by multiple CRCs to substantially prevent accidental or intentional corruption between creation and loading into a module, based on the "black channel" concept from the IEC61508 specification. Data protection is important, since unknown events may occur to the file between creation and loading onto a module. Bundle files may be created through automated scripts running on a build server to ensure that human error will not result in a faulty or unsafe bundle.

In one example, field updates may be performed by using an interface class module to load the contents of a bundle file onto the various modules connected to the interface class module. Bundle files may be accessible to an interface class module through various data connections, including a connected USB mass storage device, a connected SD card, internal memory, or a network connection.

Bundle files may include a manifest file that lists, for example, the individual files contained in the bundle, their associated module number, and their version number. Information included in the lists may be provided as plain text, markup language, an encoded format, or in another format that would be apparent to a person of skill in the art. Bundle files may optionally include multiple versions of firmware for the same module mapped to different hardware revisions.

Factory bundles may exclusively contain factory descriptor templates and other software intended for use during production. Factory descriptor templates are files used by various production test fixtures to create customized descriptors for each module produced at the factory. Each descriptor may be customized with certain information unique to each module, for example, serial number and calibration data. Example factory bundle templates include a motherboard descriptor template, core descriptor template, and calibration descriptor template. Additionally, for example, a disk image is includable in the factory bundle containing a partition map, U-Boot, and/or a Linux file system for use on an interface module. Factory bundles are generally not intended for release to the general public.

Bootloader bundle files may include the most recent version of the bootloader for each existing core at the time that the bundle was created. Bootloader bundles may be used by licensed contract manufacturers to make new products or to refurbish existing products. Bootloader bundles may also be released to the general public for field upgrading of bootloaders.

The original factory loaded bootloader is virtually always write protected in a module to prevent being accidentally overwritten, allowing the bootloader to be safely field updated without risk that the module may become bricked. Field updated bootloaders are virtually always stored at a secondary location in the module which is not write protected and can be overwritten again to update to future versions of the bootloader.

Firmware bundle files may include the latest firmware images for a module. The software for modules in a firmware bundle may be tested and known to work properly with virtually any combination of the modules within the bundle. Firmware bundles may be used by licensed contract manufacturers and at local facilities to make new products or to refurbish existing products. Firmware bundles may also be released to the general public for field upgrading of firmware.

Firmware may be modifiable to alternative versions, for example, via updates that change the purpose of a module are not possible in the field, as an unsafe condition may be created and could result in a product that does not match its factory applied labelling. In addition, firmware updates likely would not change the region code of a module.

Settings bundle files may include a set of firmware settings for one or more modules, which may be created by a user. As a first example, firmware settings may be created by manually entering them via an interface class module and then extracting to a file. In a second example, the firmware settings may be created by using a tool running on a computerized device, such as a PC, to create the settings. Numerous reasons exist to create a settings bundle such as, for example, to save a backup copy of settings so that they can be easily restored in the future and to easily configure multiple systems with the same settings. Settings bundles may normally not be made publicly available because they are specific to a given customer. Settings bundles also may not normally be used at the factory because the firmware creates its own settings descriptor with default settings when it runs for the first time.

Hardware and firmware may optionally be recalled through the firmware update mechanism. The firmware update mechanism may be used to update, revert, or otherwise modify the version of firmware to an alternative version of the firmware, without limitation. A recall list may be included inside of firmware bundles, which can notify users of potential hazards or recalls affecting software, hardware, or combinations.

When a firmware bundle file is loaded into an interface module, the recall list may be copied to the interface module internal memory. The recall file may include rules to never downgrade versions, whereas the firmware bundle version may be downgradable to an alternative version, substantially ensuring the recall list is always up to date even if a user chooses to downgrade their firmware. The recall list may include hardware, firmware, and combination recalls, each including a section to specify modules or versions being recalled and reason.

When a system is started from an interface module, the system may check all hardware and firmware components in the system against the recall list. If any are found that match the list, a warning may be displayed before the system is permitted to start. The warning may provide a summary of the recall and will allow the user to obtain more detailed information about the safety risk before proceeding to start the system. The recall list might not prevent the system from running, as preventing the system from running could be more dangerous in some situations than allowing the firmware to run. The recall list serves as a tool to warn about potentially dangerous situations and allows the user or site operator to decide the appropriate course of action. An interface module may set a warning bit inside of a control class module to allow for remote notification of recall list issues. The system and PFRN physical layer may also automatically detect whether modules have incompatible or uncertified firmware and prevent operation which might lead to an unsafe condition.

Additional safety features of the system and safety network protocol will now be discussed. The modules of the distributed networking system are interconnected via a safety network, the "PFRN" for short. The safety network may be at least a SIL3 rated network based on Ethernet that enables easy system installation and expansion. This safety network may also distribute DC power, avoiding separate power bus requirements.

Although based on Ethernet, the safety network is generally incompatible with Ethernet devices and protocols. Custom EtherTypes may be used that can overlap with the public internet, thus, the PFRN physical layer should not be connected to the public internet. While doing so will typically not create an unsafe condition, it may result in unreliable operation.

Control class modules on the same PFRN physical layer can be logically grouped together to form an appliance to coordinate multiple control class modules to accomplish a common task and/or a series of related tasks. By default, each control class module may behave independently forming an individual appliance on its own. The maximum number of appliances on a given PFRN physical layer may be limited by the number of control class modules. The protocols carrying safety related data are designed to fail in a safe manner in the event that a network cable break or short occurs.

Appliances can be utilized to provide application level redundancy, thus ensuring greater reliability of the application. The degree of redundancy is selectable by a number of redundant control modules grouped into the appliance. For example, two control modules with the same function can run in parallel within an appliance and continue running so long as one or more remain online, which may improve reliability. In another example, two control modules with the same function can run in serial within an appliance and continue running so long as both remain online, which may improve a safety state environment. Redundancy may be increased with additional control modules in an appliance. Appliances may be organized through settings stored in each control class module, which may define appliance type, the MAC addresses of all control modules in the appliance, assigned role that each control module plays, and safe-state criteria if one or more constituent control modules go offline.

Figure 15:
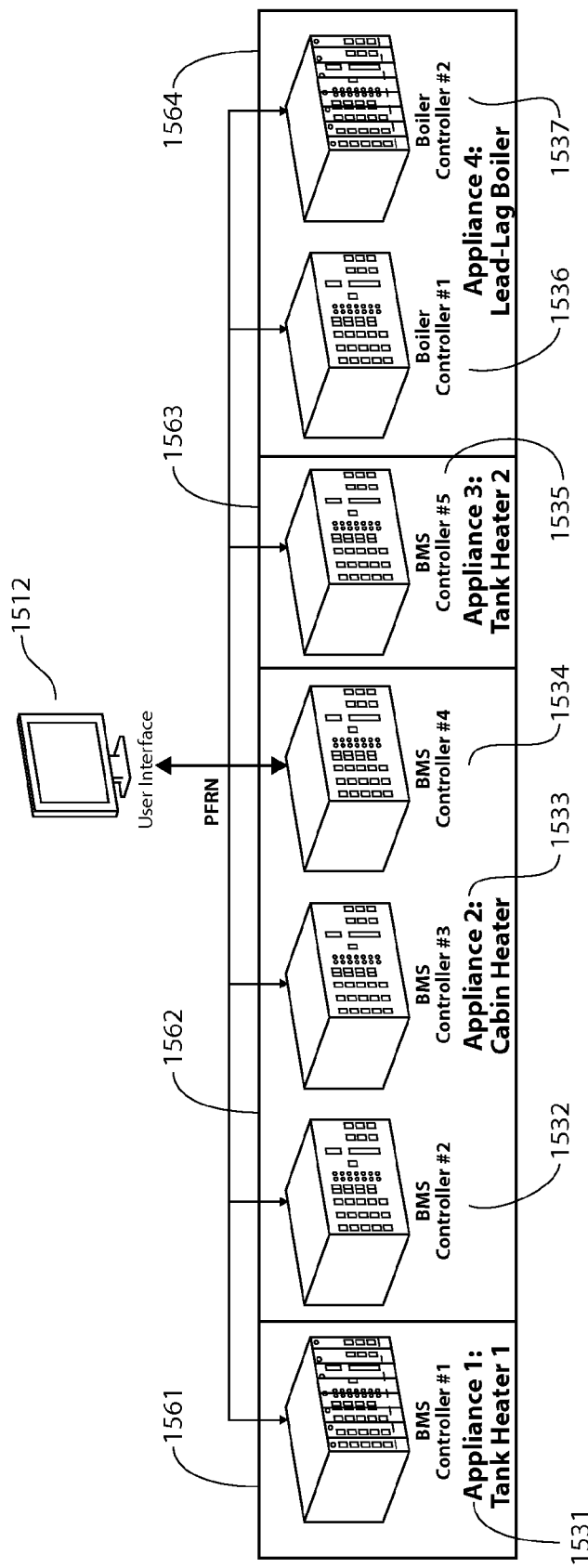
FIG. 15 is a block diagram view of an illustrative appliance of the distributed networking system in a burner management application, according to an embodiment of this disclosure.

Referring now to FIG. 15, an illustrative appliance will now be discussed without limitation. In this example, seven control class modules 1531, 1532, 1533, 1534, 1535, 1536, 1537 and one interface module 1512 are connected to a single PFRN physical layer. Of the seven control class modules, five are BMS controllers 1531, 1532, 1533, 1534, 1535 and two are boiler controllers 1536, 1537. Two BMS controllers 1531, 1535 are setup as independent tank heater appliances 1561, 1563. Each tank may be managed autonomously from the other by its controller. BMS controllers 1532, 1533, 1534 are grouped together to form a cabin heater appliance 1562. These controllers may work together, sharing status with each other to ensure that the target process temperature is maintained in a reliable manner. The degree to which these controllers are redundant will depend on the maximum heat demand of the process relative to the maximum heat supply of the three controllers 1532, 1533, 1534. The two boiler controllers 1536, 1537 are also grouped as a lead-lag boiler appliance 1564. One of the controllers is programmed as the lead and the other as the lag.

Control class modules are designed to never route safety packets from one network to another. Multiple control class modules generally cannot communicate with the same I/O class module, as the I/O class module is physically present on only one network. If an I/O class module assigned to a control class module is physically moved to a second network, it will generally not function on the second network unless the control class module of the second network is reprogrammed to recognize the moved I/O class module.

In one embodiment, the PFRN physical layer may be divided into two types of segments, interface segments and I/O segments. On the interface segments, provided by a first network segment, only interface class and control class modules may be present. On the I/O segments, provided by a second network segment, only I/O class and control class modules may be present. If a module is placed on the incorrect segment, it will not operate and will remain in a safe state.

In one embodiment, I/O segments are designed as private to a control class module. If more than one control class module exists on a given I/O segment, the modules will detect this and shut down. Also, if a packet from an I/O class module associated with a different control class module is found on the network, all modules may shut down.

As discussed above, the distributed networking system may include safety cores (ASC, SSC), which may contribute to the safety of the system. The safety cores may include dual processors which implement 1oo2 or other voting logic. If the processors disagree on state, I/O, or communications, they will shutdown into a safe state. The safety cores may also include redundant I/O connected circuitry on the motherboard to implement safe inputs and outputs. The safety cores may default to a safe state with all I/O tri-stated on power up and in the event of software detectable failure.

Each processor within each safety core may have its own bootloader. The bootloader may perform the following safety related functions. The following steps are provided as an example, without limitation. Skilled artisans will appreciate that the steps may be followed in the order described or an alternative order, without limitation. First, the processor may verify itself, including the encapsulating bootloader descriptor to ensure that the bootloader itself is not corrupted. The processor may next perform a set of hardware tests to ensure that the processor is working well enough to execute the bootloader reliably. The processor may then verify the core processor descriptor and compare it to the bootloader descriptor, ensuring that the bootloader is running on the correct processor on the correct safety core. Subsequently, the processor may verify the motherboard descriptor to ensure that it knows which firmware is compatible with the motherboard. Next, the processor may load new firmware and settings via the firmware update protocol, if required. The processor may then verify the firmware descriptor and the firmware bundle descriptor, comparing them to the motherboard descriptor and core processor descriptor to ensure that the firmware is compatible. The processor may next check the other processor for errors in case it has caught an error that this processor has not. After this step, the processor may compare certain fields within various descriptors with certain fields within various other descriptors from the other processor to ensure that they match. If all the above checks pass successfully, the processor may pass control to the firmware.

In one embodiment, the bootloader may initially ensure that the bootloader is uncorrupted and compatible with the core on which it is being run, for example, via self-validation. To accomplish this validation, the bootloader may verify its structure and CRC. The bootloader may then compare certain fields in the bootloader descriptor with certain fields in the core descriptor. The bootloader may then verify that any bootloader running on other processors of the same core is also compatible. Then, the bootloader may ensure that the firmware about to be executed is uncorrupted and compatible with the hardware on which it is being run. Ensuring data integrity and compatibility may include validating the firmware bundle structure and CRC and then performing various comparisons of its contents with the contents of other descriptors, such as the motherboard and core descriptors. The bootloader may also compare the firmware about to be executed by all processors included by the core to ensure that the processors are also compatible with the firmware. If all of these checks pass, control may be passed from the bootloader to the firmware. If one or more checks fail, control may not be passed to the firmware and all safety related processor I/O pins may remain in a tri-state. Optionally, motherboard hardware may be designed by convention to remain in a safe state whenever the controlling I/O pins are tri-stated. In one embodiment, the bootloader may check for a network signal that it should perform a firmware update before validating the existing firmware. In this case, it the bootloader may first perform the firmware update before validating the firmware and passing control.

Additionally, each processor of each safety core may have its own firmware. After control is passed by the bootloader to the firmware, both processors may first verify that their firmware settings descriptors pass a CRC check. The processors may match the settings of the other processor before proceeding. Next, both processors may verify that the settings version matches the expectation of the firmware. If the settings version is not correct, the firmware may attempt to upgrade the format if possible. Individual settings may then be checked to ensure that they are within acceptable limits. Invalid settings may be reverted to factory defaults and the system may not run until the settings are validated by an operator.

In embodiments wherein the firmware uses a factory calibration descriptor, both processors may first verify that their factory calibration descriptors pass a CRC check and that the calibration values match the values of the other processor before using them. Both processors may next verify that the factory calibration version matches the expectation of the firmware. If the factory calibration version is not correct, the firmware may attempt to upgrade the format if possible. If not possible, default values may be assumed and a warning may be asserted to the operator. The operator may be required to acknowledge the warnings before the system will run. Individual factory calibration values may then be checked to ensure that they are within acceptable limits. Any failed factory calibration validation step in this section may cause the firmware to set an alarm and remain in a safe state. Module specific tests may then be performed to verify that the motherboard hardware is functioning properly. Finally, networking tests may be performed to ensure that the module is installed in the correct network segment.

Each processor within each safety core typically has its own firmware. After the firmware startup tests complete and the main program begins executing, the main program may periodically run self-tests, if warranted by the application, to ensure the continued proper operation of the hardware. For example, a marching bit test may be performed on each RAM block in flash memory, registers, processor core, and other components.

Some control class modules can be logically grouped together through their software settings into an appliance configuration. This may allow multiple related components to start and stop as a single appliance or to provide a level of redundancy, which may fail operationally. Voting logic may additionally be included and/or increase grouping in an appliance. In virtually all cases, safety will be considered paramount and will take precedence over any features designed to offer user convenience or product reliability.

Data logging to internal memory or an attached USB Flash Key may be supported by the interface module. This feature may use the same interface as with the firmware update process.

In operation, the distributed networking system may be used with the PFRN protocol and safety network to substantially safely and efficiently control modules in a distributed system while reducing the cost and difficulties inherent to prior component management systems. Those of skill in the art will appreciate that the methods of this disclosure are provided to illustrate an embodiment of the invention, and should not be viewed as limiting the invention to only those methods or aspects. Skilled artisans will appreciate additional methods within the scope and spirit of the disclosure for performing the operations provided by the examples below after having the benefit of this disclosure. Such additional methods are intended to be included by this disclosure.

The PFRN protocol may provide a safety network at least partially via protocol encapsulation. In one embodiment, the PFRN protocol may include a physical layer protocol, a reliability protocol, a security protocol, and a safety protocol. The safety protocol may be used so that communications will be inherently SIL3 compliant and so that virtually all communication paths can be treated as a "Black Channel." A proprietary safety protocol may be used to facilitate efficient operation on low-powered and/or low-bandwidth devices.

When controller class modules and I/O class modules communicate, it is essential that they do so in a safe manner. Since Ethernet data is susceptible to being corrupted during transmission, a safety protocol is required to establish connections between modules and ensure that the data passed between them has not been corrupted.

The safety protocol may include protocol error detection and watchdog monitoring. Error detection of the safety protocol may use a CRC and other measures to minimize the possibility of corrupted data being mistaken as valid data, which could lead the system into an unsafe state. Watchdog monitoring may detect if the link to a module fails, either due to physical damage to the link or damage to the module itself. Watchdog monitoring may facilitate other modules in the system to detect this failure and respond in an appropriate manner. The safety protocol may provide protection against this through the use of watchdog timeouts. If a module stops communicating or consistently communicates invalid data, the rest of the system can use the safety protocol to detect this failure and safely terminate links to the unsafe module.

Since the safety protocol encapsulates other protocols (interface, application, etc.) it can be used to substantially safely communicate any type of data between modules. By using the safety protocol, the underlying network layers, for example, Ethernet, can be considered "Black Channel," such as described in IEC 61508.

Network structure of the safety protocol will now be discussed. The safety protocol may not inherently impose any restrictions on the structure of the network or protocol stack. The protocol may optionally include routing schemes, wherein the protocol stack and network utilize any arrangement of unicast, multicast or broadcast communications, and/or network node relationships, where no restriction on designing communications using a master/slave, server/client, or any other system of role-based flow control are required. The safety protocol substantially guarantees safe transmission of data through the detection of corrupt data, so long as it is implemented in a system with a safe architecture.

Frame structure of the safety protocol will now be discussed. The safety protocol may be split into its sub-frames. Each sub-frame may include fields, such as a safety address field, a frame ID field, a payload length field, and a sequence number field.

The safety address field may include the MAC Address of either the source or destination of the frame. The Frame ID may be used to determine which end of the link the address represents. This field may be identical in related sub-frames. The protocol may use an address, for example, a 6 byte Ethernet MAC address, that is already inherent to Ethernet communications, advantageously removing the requirement of a separate safety address from the MAC. In an alternative embodiment, the safety protocol may use a single byte in its frames for addressing. The Frame ID may be used to distinguish different types of safety protocol frames. The Product ID may prevent erroneous communication between different products if they are wired together accidentally. The Frame Type may describe the format of data encapsulated by the safety protocol.

The security protocol may encapsulate the safety protocol. An encryption layer may be included by the security protocol to ensure a certain Security Assurance Level ("SAL"), for example, as provided by IEC 62433.

The reliability protocol may encapsulate the security protocol. Due to the large bit error probability of underlying Ethernet communications networks, frame corruption is expected within the communications network. While other protocol layers may detect these errors, the reliability protocol provides retransmission in the case of corruption. Without a retransmission protocol, any detected bit corruption would likely result in the Safety Protocol shutting down the system.

The physical layer protocol may encapsulate the reliability protocol. The physical layer protocol may provide communication between modules via a physical connection, for example, Ethernet.

The PFRN protocol may include additional communication links, which may include additional protocols. Example communication links will now be discussed, without limitation.

An interface protocol may be provided to facilitate interface class to controller class communications. Interface class modules may periodically request data from each controller class module in the system. The interface protocol may provide this data transmission, which may define a series of commands used by interface class modules to write and read data to/from controller class modules. Some examples of where the interface protocol is used include: user interface module (UIM) to burner management system controller (BMS) communications, user interface module (UIM) to flare controller module (FCM) communications, and user interface module (UIM) to Boiler controller module (BCM) communications.

An appliance protocol may be provided to facilitate controller class to controller class communications. The appliance protocol may be used by controller class modules to broadcast status information to other controller and interface class modules on the network. The standard data in these packets may be fixed for a specific controller module in a specific mode of operation, but additional broadcast data can be requested by interface class modules. A controller module's model number and firmware bundle number may be known to other controller and interface modules on the network. Data may be transmitted via the appliance protocol, for example, including process data fields, standard process data, and additional process data.

An I/O protocol may be provided to facilitate controller class to I/O class communications. Controller class modules and I/O class modules may communicate using the I/O protocol. The controller class module may send requests to specific I/O class modules, which in turn service the requests and send responses back to the controller class module. This link may be used to send output values, read inputs and status information, and also to send commands. Some examples of where this protocol will be used include: valve train module (VTM) to temperature module communications, valve train module (VTM) to ignition module communications, valve train module (VTM) to forced draft module communications, flare controller module (FCM) to ignition module communications, boiler controller module (BCM) to temperature module communications, and boiler controller module (BCM) to ignition module communications. This protocol may share similarities to the interface protocol.

Additionally, a core safety protocol may be provided to facilitate primary safety core processor to secondary safety core processor communications for moving sub-frame safety data. A core cross compare protocol may be provide to facilitate primary safety core processor to secondary safety core processor communications for cross comparing data settings and status. A firmware update protocol may be provide to facilitate interface class to controller and I/O class. A firmware update bridge protocol may be provide to facilitate a bridging protocol to pass firmware update protocol between the user interface side and device side of the controller module. The firmware update bridge protocol may also be used to enable a secondary processor to have its firmware updated by its associated primary processor. An external protocol may be provide to facilitate communications module to external devices to enable remote monitoring and control of the system.

The PFRN physical layer may use some or all of the above protocols to facilitate the flow of communications between modules. Architectural safety is advantageously increased via use of the inter-module communications structure provided by this disclosure. Although the safety protocol provides protection against data corruption, the entire protocol stack may be combined to create a functional communications system.

Interface class modules are not typically a safety-critical component of a PFRN network. Interface class modules may monitor controller class module traffic and send requests to controller class modules. With monitoring controller class module traffic, interface class modules may share their physical network with controller class modules. As controller class modules communicate with each other, interface class modules may receive this traffic as well to provide the user information such as the status of the network and process data being reported by each controller class module. This functionality advantageously generates virtually no additional network traffic and does not significantly impact the behavior of the system. Therefore, these communications are considered non-safe and do not warrant any safety considerations.

The interface class modules may send requests to controller class modules. Using the interface protocol, interface class modules may asynchronously send requests to controller class modules. The interface protocol may describe the various types of requests that can be made on these links.

When an interface class module makes a request to a controller class module, the controller class module may be completely responsible for determining how to respond to the request. Therefore, even if an interface class module sends unsafe data erroneously (e.g. falsely sending "Start" commands when it is unsafe to start) the controller class module can still refuse the request if it will lead to an unsafe condition. These communications may be encapsulated by the safety protocol, using the protocol's data integrity assurance measures (data duplication and CRCs) to prevent corrupted requests from being interpreted as valid. However, in some instances, the sequence numbers from the protocol are not implemented as there is no continuous transmission of data between interface class modules and connected controller class modules. Interface class modules may discard incoming frames which do not match one of the following safety protocol frame structures.

I/O class modules are safety-critical components and it is generally necessary that all of their communications are handled in a safe manner. During operation, an I/O class module may be registered to a single controller class module. The I/O class module may only communicate process data with this controller class module unless the communication link fails. An I/O class module will virtually never generate any network traffic unless a request is made from a controller class module. The I/O class module should only ever have a physical link with a single controller class module, but I/O class modules may also provide protection to prevent against wiring errors leading to unsafe system behavior. In one embodiment, pairing of one I/O module to one controller module is achieved by the isolated safety networks. This isolated pairing helps ensure that accidentally pairing one I/O module to multiple controller modules is not possible. Additionally, in this embodiment, the isolated paring helps ensure that accidentally assigning a given I/O module to the wrong controller is not possible because the incorrect controller module physically cannot see or communicate with that I/O module. Here, an I/O module cannot erroneously be controlled by another controller. Nor can another controller erroneously receive status information from an I/O module that is not on its network.

Periodically, controller class modules send broadcast frames with the "I/O Address Poll Request" safety protocol frame type. These frames may be used to determine the status of all connected I/O class modules, and each I/O class module that receives this frame responds to this request. I/O class modules may also use these frames to determine which controller class module they should register as their controller. Once a controller class module learns about a connected I/O class module, it may continuously request data from the I/O class module. The I/O class module may continue responding to these requests indefinitely.

Controller class modules perform network discovery and fault detection tasks. Controller class modules are responsible for discovering connected I/O class modules as well as other controller class modules in the same appliance. Typically, no discovered module is functional without some form of user confirmation; this loosens the safety requirements for this network discovery functionality, since the process of network discovery will never change the functionality of the system without user confirmation.

Controller class modules also perform direct I/O data transfer. Controller class modules communicate process data with I/O class modules. I/O class modules may provide safety-critical input and output, so this data transfer must be done in a safe manner to ensure the safety of the system. Additionally, controller class modules within the same appliance generally must communicate with each other safely. The various controller class modules pass process data between each other, but generally must also be able to detect faults/errors in other controller class modules within the same network and react appropriately.

Interface class modules may asynchronously make requests to controller class modules, which may involve transitioning the state of the controller class module. From a network perspective, this communication is not safety-critical, since the controller class module bases its decision and response to the request on its own safety state machine, which is isolated from these interface class module requests. Controller class modules may simultaneously communicate on isolated segments of the system. One segment may contain solely I/O class modules and the other may include both interface class and controller class modules. In the following sections, each state machine is only executed on one segment of the network. For instance, the network discovery state machine is only executed on the segment of the network where I/O class modules should be connected.

Each controller class module may be manually configured to be aware of other modules in its appliance. During multi-controller operation, each controller class module may maintain a table of these other controller class modules. By receiving appliance broadcast frames, each module may be able to update its table and detect if another module or its link have become unsafe. This failure detection may be at least partially accomplished by maintaining an independent watchdog timer for every other controller class module in the appliance. If a broadcast frame is not received from the module within the watchdog timer's period, the module is assumed to be in an unsafe state.

Each controller class module may be manually configured with a set of I/O class modules that it controls. Due to the safety-critical nature of this control, the controller class module generally must ensure that the I/O class modules are operating correctly. To accomplish this, a substantially constant stream of data may be passed the controller class module and each of its I/O class modules. The controller class module may maintain a watchdog timer for each I/O class module. If this timer expires before a valid frame is received from the I/O class module, the module is marked as inactive/unsafe, and the controller class module will take a corrective action, for example, shutting down.

Error detection in the PFRN protocol will now be discussed. Error detection may include operations based on accepted industry standards, for example, IEC 61784-3. Skilled artisans will appreciate that safety operations of the PFRN protocol may omit, add to, or otherwise deviate from industry standards after having the benefit of this disclosure. The safety protocol CRC is an important measure of detecting corruption errors. Both CRC polynomials used by the safety protocol provide a definable hamming distance, for example, 4, so any bit-corruption up to this threshold will be detected.

Additionally, the multi-channel architecture of safety-critical modules also protects against corruption. Before any safety-related state transitions, such as sparking, opening a valve, or other transitions, a required number of processors on the module must agree on the transition. If corrupted data is not detected by the CRC and leads one processor into an unsafe condition, the multi-channel architecture will prevent the processor from bringing the module into an unsafe state.

The PFRN protocol may include detection of unintended repetition. The sequence number field in safety protocol frames may protect against repeatedly transmitted frames. All modules may require that every frame with safety-critical data has a sequence number that is "newer" than that of the previously received frame. The PFRN protocol may include detection of incorrect sequence. The sequence number in safety protocol frames may also protect against incorrectly sequenced frames.

The PFRN protocol may include detection of loss. In general, the loss of individual frames does not impact the safety of the system. Safety-related data is continuously streamed between modules, and the loss of individual frames is irrelevant as long as data is streamed without unacceptable delays. If, due to error, only one processor on a module receives a frame, the multi-channel architecture of the module will typically prevent this from leading to an unsafe condition.

In one embodiment, the PFRN protocol may include detection of unacceptable delay. Virtually all safety-critical communication links on the PFRN network are monitored by a watchdog timer implemented by the modules on each end of the link. If there are unacceptable delays in either direction on the link, a watchdog timer will typically detect the failure.

The PFRN protocol may include detection of insertion. Generally, data not encapsulated by the safety protocol cannot lead the system into an unsafe state. Due to the strict formatting on safety protocol frames (duplicated with two CRCs) it is virtually impossible for an arbitrary frame to pass the safety protocol error detection. However, it is possible for the safety protocol to encapsulate non-safety-critical data, for example, interface class module communications. If these frames are inserted into a safety-critical part of the network due to wiring errors, frames with invalid sequence numbers are discarded on safety-critical links. If a module begins communicating non-safe data on one of these links, it is unlikely that the sequence numbers in these frames will align with the safety-critical sequence numbers already used on the link. Additionally, the Frame ID field in the safety protocol frame also provides strong protection against insertion. Non-safe communications with interface class modules have a different Frame IDs than safety-critical frames.

The PFRN protocol may include detection of masquerade errors. The PFRN protocol and system provides similar error detection for masquerade errors as it does against insertion errors. The primary distinction between insertion and masquerade errors is the source of erroneous data. Insertion errors originate from nodes that do not belong on the network, such as interface class modules or general network equipment on the I/O class module side of the network. Masquerade errors originate from apparently valid nodes on the network. As with insertion errors, frames with invalid sequence numbers may be discarded. It is unlikely that a malfunctioning module will synchronize its sequence number perfectly with the traffic on another safety-critical link. Additionally, Communications between controller class and I/O class modules is substantially all point-to-point. Although the protocol layers below the safety protocol are deemed "black-channel", the implementation of Ethernet by the system (switches/MACs/PHYs filtering misaddressed point-to-point frames) would likely prevent a controller class module from communicating with multiple I/O Class modules masquerading as one.

The PFRN protocol may include detection of addressing errors. For safety-critical communication from controller class to controller class, the communication is broadcast in nature and each module only reports status information about itself. Virtually no controller class module can command another controller class module to take some safety-related action. Thus, there is virtually no concern with misaddressed frames. For controller class to I/O class communication, after a link is established between a controller class and I/O class module, the address of each module is known through the ADDR field in the safety protocol as well as the MAC addresses of the encapsulating Ethernet frames. Each received frame may be filtered based on its ADDR field, so any misaddressed frames will be detected at this stage.

The PFRN safety network may include core safety protocol and core cross compare protocol, which are responsible for the safe composition and decomposition of safety protocol frames. In order for the safety protocol to meet SIL3 requirements, separate processors must be used to read and write each sub-frame of the entire safety protocol frame.

An illustrative safety protocol frame transmission may include the steps of the following example. Sensor data may be read by Processor A and Processor B. The sensor data may be compared by both processors using the core cross compare protocol. Each processor may create a safety protocol sub-frame independently. Processor B may transmit its safety protocol sub-frame to Processor A using the core safety protocol. Processor A may combine the received sub-frame with its own sub-frame, and send the combined frame over the network.

Upon receiving a safety protocol frame, an illustrative safety protocol frame reception may occur as provided in the following example. Processor A may receive a safety protocol frame over the network and breaks it into its two sub frames. Processor A may transmit one sub-frame to Processor B using the core safety protocol. Each processor may validate its sub-frame and extract the sub-frame's payload. The processors may compare the payload from the two sub-frames using the core cross compare protocol. If the two payloads agree, the frame may be considered valid and both processors may take a corresponding action.

An illustrative operation for starting the system will now be discussed. First, from virtually any screen on the UI, the START KEY may be selected on the keypad of the interface module. If alarms are present, a notification may be displayed. If no alarms are present, confirmation may be requested to start the system, which may be made by pressing the OK KEY or the operation cancelled BACK KEY.

For a burner management application, if on the Status Tab of an interface module display, the system may show a countdown, for example 5 seconds (or more if the purge cycle has not been completed). At the end of the countdown, the system may open the pilot valve and ignite the pilot with the ignition coil. The flame quality should reach about 100% on the screen. Then the system may begin its process control to maintain the process setpoint.

An illustrative operation for stopping the system will now be discussed. First, from virtually any screen on the UI, the STOP KEY may be pressed from the keypad. Confirmation may be requested to stop. The OK KEY may be pressed to confirm or the BACK KEY may be pressed to cancel. The Stop function may be unavailable if the interface is offline, disconnected from the network, or otherwise incapacitated. If a safety rated stop button is required, an appropriately rated mushroom switch may be connected to the ESD contact on the control module.

In one embodiment, the system may include a hardware self-diagnostic capability. The motherboard hardware may include self-test functionality. For example, in an embodiment with 2oo4D voting logic, the self-test functionality could advantageously provide even better diagnostics. Various parameters of the I/O circuits may be monitored, for example, current and voltage. These parameters may be used by the software to provide guidance to the user as to wiring or hardware faults that may exist. Self-test functionality may advantageously allow for suggestions as to appropriate remedies for detected failures and/or errors. For example, a troubleshooting wizard could be invoked on the user interface that may place the hardware into a special diagnostic mode. The user could then be guided through a series of steps to ascertain the determined problem and view a suggested solution. This same troubleshooting methodology can be applied to at least some PFRN networking issues. This novel self-diagnostic feature improves over current technologies and provides a strong advantage over current offerings on the market.

In one embodiment, a license key may be associated with the system. For example, a hardware license key may include a small electronic module containing encrypted data that may enable selectable features on controller class modules. The license key module may plug into a socket on the controller class module's motherboard and may be decrypted to enable certain features, such as, without limitation, multiple-controller appliances or controllers allowing multiple instances of the same type of I/O class module. As an alternative to encoding the region code in the motherboard descriptor, the region code may be encoded in the license key allowing all software specific differences between regions to all be implemented in a single firmware release.

In one embodiment, a software stack may be associated with the PFRN protocol. The software for the stack may be written in a modular form for ease of maintainability, testability, and certification. Modules may be compiled together into a single executable binary file. This modular methodology advantageously facilitates rapid develop of new applications on top of a proven code base that is already safety certified, thus reducing the time to market for future products.

In one example, the software stack may include various layers. There are three layers in this example of a stack.

A first illustrative layer may provide a safety state machine class, settings and status class, real time loop, networking classes, generic packet formats (SIL3 capable or compliant), core libraries. These first illustrative layer classes may form a code base of proven methodologies compliant with safety standards, for example, IEC61508 and UL1998 standards.

A second illustrative layer may provide application specific logic, which is substantially safety specific, and a protocol. The protocol may be for BMS controller standard. This second illustrative layer logic may be built on top of the second layer and may form part of the code base that is certified for a given application.

A third illustrative layer may provide application specific logic that is not safety related. This code may be changeable without requiring recertification. The third illustrative layer may add features or correct bugs unrelated to safety.

While various aspects of the invention have been described in the above disclosure, the description of this disclosure is intended to illustrate and not limit the scope of the invention. The invention is defined by the scope of the appended claims and not the illustrations and examples provided in the above disclosure. Skilled artisans will appreciate additional aspects of the invention, which may be realized in alternative embodiments, after having the benefit of the above disclosure. Other aspects, advantages, embodiments, and modifications are within the scope of the following claims.

What is claimed is:

1. A protocol for communicating data via a distributed networking system comprising:
   information about modules communicably connected to the distributed networking system, the modules comprising a control module;
   a descriptor providing at least part of the information about the modules; and
   a safe state environment compliant with a safety standard managed by the control module;
   wherein the protocol is operable via a transport layer of a network;
   wherein at least part of the network on which the protocol operates is a safety network managed by the control module to facilitate reliable communication and substantially prevent unsafe failure conditions in compliance with the safety standard;
   wherein the safety network is encapsulated via a safety protocol within the network, the safety network comprising enhanced error detection to substantially prohibit acceptance of unsafe data that is analyzed with the enhanced error detection and determined to be unsafe within the safety network.

2. The protocol of claim 1, wherein the modules addressable via the protocol further comprise:
   an interface module communicably connectable with the control module to facilitate interaction with the distributed networking system; and
   an I/O module communicably connected with the control module for at least partially interfacing with an accessory connected to the system, the I/O module being operable in a sensing configuration and a directing configuration, wherein interfacing with the accessory while operating in the sensing configuration comprises receiving sensory data from the accessory, and wherein interfacing with the accessory while operating in the directing configuration comprises providing operational instruction to the accessory;
   wherein the control module addressable by the protocol further comprises a safety core to communicate the data and affect operation of at least part of the modules, the control module substantially implementing the safe state environment by verifying compliance with the safety standard and distributing the safe state environment that is in compliance among the modules.

3. The protocol of claim 2, wherein the network comprises a first network section between the interface module and the control module, wherein the network comprises a second network section between the control module and the I/O module, and wherein the protocol is discretely operable on the first network section and the second network section.

4. The protocol of claim 3, wherein at least part of the data is communicable over the first network section, and wherein at least part of the data is communicable over the second network section in compliance with the safety standard.

5. The protocol of claim 3, wherein one or more control modules are communicable with the interface module via the first network segment, at least one of the one or more control modules selectively broadcasting to the interface module, and wherein one or more of I/O modules are communicable with the control module via the second network section.

6. The protocol of claim 2, wherein the safety standard comprises redundant analysis of the data via the safety core that comprises voting logic to verify the data that is analyzed.

7. The protocol of claim 1, wherein communication of the data via the network is distributable via a network module communicably connected among the modules to relay the data communicated among the modules, wherein the data relayed via the network module is not altered by the network module, and wherein the protocol is not altered by the network module.

8. The protocol of claim 1, further comprising power distribution aspects for distributing power from the control module to at least part of the modules without altering the data communicated via the protocol.

9. The protocol of claim 1, wherein the safety standard is at least substantially SIL3 compliant.

10. The protocol of claim 1, wherein the safety protocol is encapsulated in a reliability protocol to analyze the data for corruption, wherein retransmission is requested via the reliability protocol for the data that is received with the corruption.

11. The protocol of claim 1, further comprising appliance grouping to logically associate the control module with one or more additional control modules as an appliance to direct the control module and at least one of the one or more additional control modules of the appliance to accomplish related tasks, wherein the safe state environment, reliability, or the safety state environment and reliability of the distributed networking system is improvable via redundancy provided by the appliance.

12. The protocol of claim 1, wherein the distributed networking system is operable with a firmware comprising embedded instructions to control the modules, the firmware being identifiable via the descriptor, wherein the firmware comprises a version field of the descriptor to identify a version of the firmware, wherein the firmware is modifiable to an alternative version that differs from the version identified by the version field via the network, and wherein the firmware is selectively transmitted via the network.

13. A protocol for communicating data for a distributed networking system comprising:

information about modules communicably connected to the distributed networking system, the modules comprising:
- a control module, and
- an I/O module communicably connected with the control module for at least partially interfacing with an accessory connected to the distributed networking system, the I/O module being operable in a sensing configuration and a directing configuration, wherein interfacing with the accessory while operating in the sensing configuration comprises receiving sensory data from the accessory, and wherein interfacing with the accessory while operating in the directing configuration comprises providing operational instruction to the accessory;
- a descriptor providing at least part of the information about the modules; and
- a safe state environment compliant with a safety standard managed by the control module;

wherein the protocol is operable via a transport layer of a network;

wherein at least part of the network on which the protocol operates is a safety network managed by the control module to facilitate reliable communication and substantially prevent unsafe failure conditions in compliance with the safety standard;

wherein the safety network is encapsulated via a safety protocol within the network, the safety network comprising enhanced error detection to substantially prohibit acceptance of the data that is analyzed with the enhanced error detection and determined to be unsafe within the safety network;

wherein the control module addressable by the protocol further comprises a safety core to communicate the data and affect operation of at least part of the modules, the control module substantially implementing the safe state environment by verifying compliance with the safety standard of the data communicated via the safety network;

wherein the network comprises:
- a first network section between an interface module and the control module, and
- a second network section between the control module and the I/O module through which at least part of the data is communicable via the safety network;

wherein the protocol is discretely operable on the first network section and the second network section.

14. The protocol of claim 13, wherein the protocol facilitates self-diagnostics to at least partially detect the unsafe failure conditions within the network.

15. The protocol of claim 13, wherein communication of the data via the network is distributable via a network module communicably connected among the modules to relay the data communicated among the modules, wherein the data relayed via the network module is not altered by the network module, and wherein the protocol is not altered by the network module.

16. The protocol of claim 13, wherein the system is operable with a firmware, wherein the firmware comprises embedded instructions to control the modules, wherein the firmware is identifiable via the descriptor, wherein the firmware comprises a version field of the descriptor to identify a version of the firmware, and wherein the firmware is modifiable to an alternative version that differs from the version identified by the version field via the network.

17. The protocol of claim 13, wherein the modules further comprise an interface module communicably connectable with the control module to facilitate interaction with the distributed networking system, and wherein the I/O module comprises the accessory.

18. A method for communicating data via a distributed networking system comprising:
- providing information about modules communicably connected to the distributed networking system via a network, the modules comprising a control module;
- providing at least part of the information about the modules via a descriptor;
- creating a safe state environment compliant with a safety standard managed by the control module; and
- operating a safety network to facilitate reliable communication and substantially prevent unsafe failure conditions in compliance with the safety standard, the safety network being encapsulated via a safety protocol within the network;
- enhancing error detection within the safety network to substantially prohibit acceptance of the data that is determined to be unsafe within the safety network; and
- verifying compliance of the data communicated over the safety network using a safety core of the control module;

wherein the distributed networking system is operable with a firmware comprising embedded instructions to control the modules that is identifiable via the descriptor.

19. The method of claim 18:
wherein the modules that are addressable further comprise:
- an interface module communicably connectable with the control module to facilitate interaction with the distributed networking system, and
- an I/O module communicably connected with the control module for at least partially interfacing with an accessory connected to the distributed networking system, the I/O module being operable in a sensing configuration and a directing configuration, wherein interfacing with the accessory while operating in the sensing configuration comprises receiving sensory data from the accessory, and wherein interfacing with the accessory while operating in the directing configuration comprises providing operational instruction to the accessory;

wherein the network further comprises:
- a first network section between the interface module and the control module, and
- a second network section between the control module and the I/O module;

wherein the protocol is discretely operable on the first network section and the second network section;

the method further comprising:
- communicating at least part of the data over the first network section without strict adherence to the safety standard,
- communicating at least part of the data over the second network section in compliance with the safety standard to facilitate the reliable communication and substantially prevent the unsafe failure conditions.

20. The method of claim 18, further comprising:
redundantly analyzing the data via the safety core comprising voting logic; and
verifying the data that is analyzed via the voting logic.

* * * * *